(12) United States Patent
Donahue et al.

(10) Patent No.: US 9,731,348 B1
(45) Date of Patent: Aug. 15, 2017

(54) METHOD AND APPARATUS FOR AVOIDING EROSION IN A HIGH PRESSURE DIE CASTING SHOT SLEEVE FOR USE WITH LOW IRON ALUMINUM SILICON ALLOYS

(71) Applicant: Brunswick Corporation, Lake Forest, IL (US)

(72) Inventors: Raymond J. Donahue, Fond du Lac, WI (US); Steven C. Knickel, Campbellsport, WI (US); Terrance M. Cleary, Fond du Lac, WI (US); Kevin R. Anderson, Fond du Lac, WI (US); Kevin R. Morasch, Fond du Lac, WI (US); Mark R. Witzel, Waukesha, WI (US)

(73) Assignee: Brunswick Corporation, Lake Forest, IL (US)

( * ) Notice: Subject to any disclaimer, the term of this patent is extended or adjusted under 35 U.S.C. 154(b) by 218 days.

(21) Appl. No.: 14/793,329

(22) Filed: Jul. 7, 2015

Related U.S. Application Data

(63) Continuation-in-part of application No. 13/829,160, filed on Mar. 14, 2013, now Pat. No. 9,114,456, (Continued)

(51) Int. Cl.
  *B22D 17/20* (2006.01)
  *C23C 4/08* (2016.01)
  *B23K 26/34* (2014.01)

(52) U.S. Cl.
  CPC ........ *B22D 17/2023* (2013.01); *B23K 26/345* (2013.01); *C23C 4/08* (2013.01)

(58) Field of Classification Search
  CPC .... B22D 17/20; B22D 17/2023; B22D 17/30; C23C 4/08
  (Continued)

(56) References Cited

U.S. PATENT DOCUMENTS 3,515,203 A 6/1970 Parlanti et al.
3,516,480 A 6/1970 Woltering
(Continued)

OTHER PUBLICATIONS

Alan Kaye et al., Die Casting Metallurgy, Butterworths Monographs in Materials, Butterworth Scientific, First Published, 1982, ISBN 0-408-10717-0, 5 pages.
(Continued)

*Primary Examiner* — Kevin P Kerns
(74) *Attorney, Agent, or Firm* — Andrus Intellectual Property Law, LLP

(57) ABSTRACT

An improved shot sleeve for high pressure die casting of low-iron aluminum silicon alloys and a method of making the shot sleeve, the shot sleeve includes a top portion including a pouring hole and a bottom portion including an impingement site on an inner surface of the bottom portion opposite the pouring hole. The impingement site is constructed of an erosion resistant material. The erosion resistant material is selected from: titanium, tungsten, molybdenum, ruthenium, tantalum, niobium, chromium, vanadium, zirconium, hafnium, boron or a secondary, tertiary or quaternary alloy formed from combination thereof. An erosion resistant insert located at an impingement site of a shot sleeve may accomplish the construction. The insert may be introduced into an internal surface of a conventional shot sleeve or replace a bottom portion of a conventional shot sleeve.

15 Claims, 26 Drawing Sheets

Related U.S. Application Data which is a continuation of application No. 13/785,926, filed on Mar. 5, 2013, now Pat. No. 9,114,455.

(60) Provisional application No. 61/617,739, filed on Mar. 30, 2012.

(58) Field of Classification Search
USPC ........ 164/113, 303, 312; 427/455; 29/527.6; 219/76.1
See application file for complete search history.

(56) References Cited

U.S. PATENT DOCUMENTS

| | | | |
|---|---|---|---|
| 3,532,561 A | 10/1970 | Barto et al. | |
| 3,664,411 A | 5/1972 | Carver et al. | |
| 3,685,572 A | 8/1972 | Carver et al. | |
| 3,810,505 A | 5/1974 | Cross | |
| 4,036,113 A | 7/1977 | Kunz | |
| 4,086,953 A | 5/1978 | Kraklau | |
| 4,154,288 A | 5/1979 | Borgen | |
| 4,311,185 A | 1/1982 | Zimmerman | |
| 4,334,575 A | 6/1982 | Miki et al. | |
| 4,463,793 A | 8/1984 | Thurner | |
| 4,534,403 A | 8/1985 | Harvill | |
| 4,583,579 A | 4/1986 | Miki et al. | |
| 4,598,762 A | 7/1986 | Glas | |
| 4,623,015 A | 11/1986 | Zecman | |
| 4,664,173 A | 5/1987 | Wolniak | |
| 4,667,729 A | 5/1987 | Zecman | |
| 4,842,039 A | 6/1989 | Kelm | |
| 4,886,107 A | 12/1989 | Zecman | |
| 4,899,804 A | 2/1990 | Hammerer | |
| 5,048,592 A | 9/1991 | Mueller | |
| 5,076,343 A | 12/1991 | Sandercock | |
| 5,076,344 A | 12/1991 | Fields et al. | |
| 5,425,411 A | 6/1995 | Kami | |
| 6,378,597 B1 | 4/2002 | Zecman | |
| 6,425,434 B1 | 7/2002 | Muller | |
| 6,598,450 B2 | 7/2003 | Blue | |
| 6,796,362 B2 | 9/2004 | Lombard et al. | |
| 6,820,679 B1 | 11/2004 | Lutze | |
| 6,991,670 B2 | 1/2006 | Norville et al. | |
| 7,132,077 B2 | 11/2006 | Norville et al. | |
| 7,169,350 B2 | 1/2007 | Norville et al. | |
| 7,464,744 B2 | 12/2008 | Manoff | |
| 9,114,455 B1 * | 8/2015 | Donahue et al. | B22D 17/2023 164/303 |
| 9,114,456 B1 * | 8/2015 | Donahue et al. | B22D 17/2023 164/303 |
| 2004/0026060 A1 | 2/2004 | Scott et al. | |
| 2004/0084816 A1 | 5/2004 | Hildreth | |
| 2005/0056394 A1 | 3/2005 | Kamm et al. | |
| 2007/0187061 A1 | 8/2007 | Siddle et al. | |
| 2009/0123324 A1 | 5/2009 | Andersson et al. | |

OTHER PUBLICATIONS

Dr. Phil Max Hansen, Constitution of Binary Alloys, McGraw-Hill Book Company, 1958, ISbn 07-026050 8, 4 pages.

ASM Handbook, vol. 3 Alloy Phase Diagrams, Copyright 1992, ISBN 0-87170-377-7, 6 pages.

* cited by examiner

Fig. 89. Al-Zr

METHOD AND APPARATUS FOR AVOIDING EROSION IN A HIGH PRESSURE DIE CASTING SHOT SLEEVE FOR USE WITH LOW IRON ALUMINUM SILICON ALLOYS

CROSS-REFERENCE TO RELATED APPLICATION(S)

This application is a continuation-in-part claiming priority from U.S. patent application Ser. No. 13/829,160, filed Mar. 14, 2013, now U.S. Pat. No. 9,114,456, which is a continuation of U.S. patent application Ser. No. 13/785,926 filed Mar. 5, 2013, now U.S. Pat. No. 9,114,455, which claims the benefit of Provisional U.S. Patent Application No. 61/617,739, filed Mar. 30, 2012, all incorporated herein by reference.

FIELD

The present disclosure relates to high pressure die casting, and particularly to erosion resistant shot sleeves for the high pressure die casting of low-iron aluminum-silicon alloys.

BACKGROUND

The high pressure die casting process accounts for about 70% of the annual tonnage of all aluminum castings in the United States. In the high pressure die casting process, a shot sleeve chamber connected to the die mold cavity receives molten metal poured slowly by a gravity process through a relatively small hole located distantly from the die cavity. The molten metal stream impacts an inside ID diameter of the shot sleeve opposite the small entry hole and subsequently fills the shot sleeve chamber by flowing toward the die cavity. Once the slot sleeve chamber is filled, high pressure is applied to quickly force the molten metal into the die cavity. In the die cavity, the molten metal fills the cavity in 30 to 100 milliseconds and then the molten metal is pressed against the die surface where it has the opportunity to alloy or solder to the steel die surface of the tooling as it cools and solidifies.

Traditionally, the alloys used in high pressure die casting contain about 1% iron to provide die soldering resistance. For example, the aluminum alloy ingot and casting iron concentration limits for 360, 364, 381, 383, 384, and 390 are as listed below and reflect the fact that during the die casting process, the ingot can incorporate iron from the die. The allowance for iron incorporation during the die casting process allows for the subtraction of the upper limit or maximum of the iron range specified for the ingot from the maximum iron (Fe) specification for the casting. Thus, the specification for the casting is provided only as a "max Fe" specification because the counterpart specification for the ingot provides the "min Fe" specification. Accordingly, the ingot specification and the casting specification together provide a minimum and maximum Fe range for a particular alloy composition. Specifically:

Ingot 360.2 has an iron range of 0.7-1.1% Fe and casting 360.0 has an iron max of 2.0% Fe;
Ingot 364.2 has an iron range of 0.7-1.1% Fe and casting 364.0 has an iron max of 1.5% Fe;
Ingot 380.2 has an iron range of 0.7-1.1% Fe and casting 380.0 has an iron max of 2.0% Fe;
Ingot 381.2 has an iron range of 0.7-1.0% Fe and casting 381.0 has an iron max of 1.3% Fe;
Ingot 383.2 has an iron range of 0.6-1.0% Fe and casting 383.0 has an iron max of 1.3% Fe;
Ingot 384.2 has an iron range of 0.6-1.0% Fe and casting 384.0 has an iron max of 1.3% Fe;
Ingot 390.2 has an iron range of 0.6-1.0% Fe and casting 390.0 has an iron max of 1.3% Fe.

This high level of iron of about 1% in the alloy compositions shown above severely degrades the mechanical properties of the resultant castings, particularly the ductility of the castings. Use of such alloys in high pressure die castings is therefore limited to low mechanical property applications. This problem is not simply cured by lowering the iron level to sand casting alloy and/or permanent mold casting alloy levels because a low iron level in such alloys fails to prevent the molten aluminum alloy from fully or partially soldering with a conventional die casting metal mold (generally constructed of H-13 tool steel). Thus, the die cast part may not be able to be removed or ejected from the die cavity without soldering damage to the part and/or the die. With this knowledge, iron concentrations of 0.8% or more are traditionally used for high pressure die casting operations to reduce the tendency of the casting to solder to die casting tooling.

This reduced die soldering tendency due to high iron content results because the Al—Fe—Si ternary eutectic composition occurs at about 0.8% Fe. Theoretically, when the iron constituency in the molten alloy is at or above 0.8% Fe, the molten alloy has little tendency to dissolve the relatively unprotected tool steel while the molten alloy and die or shot sleeve are in intimate contact because the molten alloy is already supersaturated with iron. This "bulk" non-alloying effect is what observers attribute the die soldering resistance to in traditional high iron containing die casting alloys.

In response to the ductility performance concerns with the high iron containing die casting alloys noted above, several newly developed die casting alloys that are low in iron content have been developed for high performance applications in the high pressure die casting process. Two of these alloys are SILAFONT-36™ and AURAL-2™ which have the Aluminum designation 365.0 [9.5-11.5% Si, 0.15% max Fe, 0.03% max Cu, 0.50-0.8% Mn, 0.10-0.50% Mg, 0.07% max Zn, 0.04-0.15% Ti, other-each 0.03% and other-total 0.10%] and A365.0 respectively. SILAFONT-36™ and AURAL-2™ both rely on manganese for die soldering resistance. The other three high-performance, low iron die casting alloys rely on strontium for their die soldering resistance. The designations for these die casting alloys are:

367.0: 8.5-9.5% Si, 0.25% max Fe, 0.05-0.07% Sr, 0.25% max Cu, 0.25-0.35% Mn, 0.30-0.50% Mg, 0.10% max Zn, 0.20% max Ti, other-each 0.05%, and other-total 0.15%

368.0: 8.5-9.5% Si, 0.25% max Fe, 0.05-0.07% Sr, 0.25% max Cu, 0.25-0.35% Mn, 0.10-0.30% Mg, 0.10% max Zn, 0.20% max Ti, other-each 0.05%, and other-total 0.15%

362.0: 10.5-11.5% Si, 0.40% max Fe, 0.05-0.07% Sr, 0.20% max Cu, 0.25-0.35% Mn, 0.50-0.7% Mg, 0.10% max Ni, 0.10% max Zn, 0.20% max Ti, 0.10% max Sn, other-each 0.05%, and other-total 0.15%

There are significant compositional differences between the traditional high iron die casting alloys and the newly developed low iron die casting alloys that rely on strontium for their die soldering resistance. The traditional high iron containing alloys rely on high bulk alloying effect levels of iron to prevent die soldering. Similarly, SILAFONT-36™ and AURAL-2™, while containing low levels on iron, rely on high bulk alloying effect levels of manganese to prevent die soldering. In contrast, the strontium containing low iron alloys rely on surface phenomena effects created with the strontium addition to prevent die soldering. Moreover, this is accomplished with only one tenth the concentration of strontium as compared to the iron concentration in the traditional high iron alloys.

Traditional high-iron die casting alloys have low ductility because they contain the iron needle-like phase $Al_5FeSi$ phase that acts as a severe stress riser in the microstructure. SILAFONT-36™ and AURAL-2™ have higher mechanical properties than these traditional high iron die casting alloys, but the bulk alloying effects create intermetallic manganese phases in the microstructure that are also stress risers, although to a lesser degree than the needle-like iron phase stress risers. In sharp contrast, the low iron, strontium containing die casting alloys do not contain intermetallic compounds or either strontium or manganese in the microstructure and therefore have the highest strain rate impact properties of the die casting alloys discussed above.

The differences between the alloys continue when the effects of shot sleeve washout and/or erosion are examined and analyzed. Prior to being injected into the die cavity, the metal is at its highest temperature when it is poured into the shot chamber through the hole in the shot sleeve farthest from the die cavity impacting an internal surface of the shot sleeve at an impingement site. With the new, low iron die casting alloys the molten metal tends to erode this impingement site where the molten metal hits the inside diameter of the shot sleeve opposite the small entry hole. Both the manganese containing die casting alloys (SILAFONT-36™ and AURAL-2™) and the strontium die casting alloys (AA designations 362, 367, and 368) exhibit good die soldering resistance in the die cavity but very poor erosion resistance at the impingement site in the shot sleeve. This creates a very serious problem due to excessive replacement costs of the die tooling, particularly the shot sleeves.

Low iron, strontium containing die casting alloys exist in a relatively static situation in the die cavity of the tooling where a thin strontium oxide or strontium aluminate film exists between the molten metal and the die, to account for die soldering prevention. Alternatively, the strontium oxide, SrO, may react with the alumina, $Al_2O_3$, and form strontium aluminate, $SrAl_2O_4$, as the barrier between the die cavity surface and the molten aluminum alloy. However, in the high pressure die casting process, when the molten metal is injected into the shot sleeve, the oxide layer on the molten metal is continuously disturbed or displaced upon impact with the inside diameter of the shot sleeve opposite the entry hole.

When molten aluminum contacts the surface of the shot sleeve the shot sleeve is heated by the molten aluminum. The turbulent flow of the molten metal breaks down any naturally occurring oxide coating that might have been on either the molten aluminum (e.g. strontium oxide or strontium aluminate) or the iron based alloy of the shot sleeve. As a result, iron dissolves into the molten aluminum and aluminum diffuses into the iron based alloy shot sleeve.

Convection currents in the turbulent molten aluminum cause any iron dissolved in the molten aluminum to be carried into the bulk liquid by fluid flow along the shot sleeve and into the die cavity, and eventually to be entrained in the casting. Thus a quasi-equilibrium condition results wherein the iron concentration on the aluminum side of the melt/sleeve interface is low. Further, the rate that iron dissolves into the melt decreases as intermetallic compounds form and grow on the shot sleeve surface. This diffusional or kinetic mechanism indicates that the transport of aluminum into the shot sleeve material is of paramount importance for washout, and the transport of iron dissolving in aluminum and into the casting is relatively unimportant.

Thus, turbulence in the molten metal stream effectively negates the beneficial die soldering resistance provided by the thin strontium oxide or strontium aluminate film on the molten metal of 362, 367 and 368 in static situations present after filling in the die cavity. The erosion by the low iron containing die casting alloy is located at the inside diameter location of the shot sleeve below the pouring hole where the turbulent flow interfaces with the shot sleeve. Similarly, the low iron, manganese containing SILAFONT-36™ and AURAL-2™ both suffer the same severe alloying and or erosion of the shot sleeve due in part to the hotter, turbulent molten metal that enters the shot sleeve through the pouring hole and impacts the shot sleeve ID surface below the pouring hole and severely disrupts any protective oxide film on the molten metal more than that which enters and is pressed the die cavity.

The result is that when the new low iron die casting alloys are used, the shot sleeve has only about a 10 to 20% of the life as compared to shot sleeves used with traditional high iron die casting alloys containing high levels of iron. While water cooling the shot sleeve produces marginal improvements in the life of shot sleeves used with low iron die casting alloys, this approach is not a solution to the broader erosion problem. Further, shot sleeves made from variants of H-13 steel, such as DIEVAR™ and QRO-90™, exhibit no significant increase in shot sleeve life when the die casting alloy is low in iron.

SUMMARY

The present application involves an improved shot sleeve design wherein either the entire shot chamber, a bottom portion of the shot sleeve chamber, or an insert is constructed of an erosion resistant material that is insoluble in molten aluminum at its melting point of about 660° C., is incorporated at the critical location where molten metal impingement occurs. It is this erosion resistant material that the molten Al—Si alloy contacts as it first enters the shot sleeve upon pouring, hitting the shot sleeve inner wall diameter opposite the pouring hole at the impingement site. Since Al—Si die casting alloys have liquidus temperatures lower than the melting point of aluminum and are thus molten at 660° C., the desired erosion resistant material should not only be insoluble in a molten Al—Si die casting alloy, but also have a melting point 1000° C. higher than that of aluminum so that any erosion resistant insert will have a relatively slow diffusion rate into aluminum.

Accordingly, an improved shot sleeve for high pressure die casting of aluminum silicon alloys containing 0.40% by weight maximum iron is provided, the shot sleeve comprising a top portion including a pouring hole and a bottom portion including an impingement site on an inner surface of the bottom portion opposite the pouring hole. The impingement site is constructed of an erosion resistant material that prevents erosion from the aluminum silicon alloys because it is insoluble in molten aluminum. The erosion resistant material is selected from: titanium, tungsten, molybdenum, ruthenium, tantalum, niobium, chromium, vanadium, zirconium, hafnium, boron, rhenium or a binary, tertiary or quaternary alloy formed from combination thereof. In other embodiments, the erosion resistant material comprises at least 85% of one of: titanium, tungsten, molybdenum, ruthenium, tantalum, niobium, chromium, vanadium, zirconium, hafnium, boron or rhenium. In another embodiment the erosion resistant material is an alloy consisting of 90% by weight tungsten, 4% by weight molybdenum, 4% by weight nickel and 2% by weight iron.

In one embodiment, the bottom portion of the shot sleeve is constructed of the erosion resistant material. In another embodiment, the top portion is also constructed of an erosion resistant material, in addition to the bottom portion. The bottom portion may be defined by a first longitudinal split line, a second longitudinal split line and a transverse split line; the split lines separating the erosion resistant material from a conventional shot sleeve construction material, such as H13 steel or other known iron-containing tool steels.

In another embodiment, the shot sleeve of the present application further comprises an outer surface having an outer diameter and an inner surface having an inner diameter. The pouring hole extends from the outer surface through to the inner surface. An insert having an outer surface, an inner surface, and an insert hole extending from the outer surface to the inner surface of the insert is then provided. The outer surface of the insert engages the inner surface of the shot sleeve and is aligned such that the insert hole in the insert is aligned with the pouring hole such that the inner surface of the insert opposite the insert hole is the impingement site. In this embodiment, the entire insert, or part of the insert including the impingement site may be constructed of the erosion resistant material.

The present application is also directed to an erosion resistant insert for high pressure die casting of aluminum silicon alloys, the erosion resistant insert located at an impingement site of a high pressure die casting shot sleeve, the erosion resistant insert comprising one of: titanium, tungsten, molybdenum, ruthenium, tantalum, niobium, chromium, vanadium, zirconium, hafnium, boron, rhenium or a binary, tertiary or quaternary alloy formed from combination thereof. In one embodiment, the erosion resistant insert is tungsten and exhibits at least a 10 times longer life than H-13 steel. In one embodiment the erosion resistant insert is introduced into an inner surface of a conventional shot sleeve, and includes an insert hole that aligns with a pouring hole in the conventional shot sleeve. In another embodiment, the insert replaces a bottom portion of a conventional shot sleeve. In yet another embodiment, the insert is spray coated or in-laid welded and rolled onto an inner surface of a conventional shot sleeve.

The present application further contemplates a method of manufacturing a shot sleeve for high pressure die casting of aluminum silicon alloys having an erosion resistant material at an impingement site. The method includes providing a high pressure die casting shot sleeve constructed of conventional material, the shot sleeve being generally cylindrical in shape and having a length, the shot sleeve further including a pouring hole extending from an outer surface through to an inner surface and an impingement site opposite the pouring hole on the inner surface of the shot sleeve. The impingement site is replaced with an erosion resistant material that prevents erosion from the aluminum silicon alloys through insolubility in molten aluminum comprising one of: titanium, tungsten, molybdenum, ruthenium, tantalum, niobium, chromium, vanadium, zirconium, hafnium, boron, rhenium or a binary, tertiary or quaternary alloy formed from combination thereof. In another embodiment the erosion resistant material comprises at least 85% of one of the following elements: titanium, tungsten, molybdenum, ruthenium, tantalum, niobium, chromium, vanadium, zirconium, hafnium, boron or rhenium. In another embodiment, the erosion resistant material consists essentially of 90% by weight tungsten, 4% by weight molybdenum, 4% by weight nickel and 2% by weight iron.

The step of replacing may further include cutting the shot sleeve longitudinally at a first location circumferentially distant from the pouring hole and at a second location circumferentially opposite to the first location, the cuts extending at least one fourth of the length of the sleeve to define terminal longitudinal ends of the longitudinal cuts. The shot sleeve may then be cut transversely to connect the terminal longitudinal ends of the longitudinal cuts. The bottom portion of the conventional shot sleeve is defined by the longitudinal and transverse cuts. An erosion resistant bottom portion is cast to match the removed bottom portion of conventional material and fastened to the remaining high pressure die casting shot sleeve constructed of conventional material.

In another embodiment, the step of replacing contemplates casting an insert of erosion resistant material, the insert having an inner surface, an outer surface, and a diameter defined by the outer surface. Conventional tool steel material is removed from the inner surface of the high pressure die casting shot sleeve such that a diameter defined by the inner surface of the high pressure die casting shot sleeve corresponds to the diameter defined by the outer surface of the insert. The insert is introduced into the inner surface of the high pressure die casting shot sleeve constructed of conventional material such that impingement site is on the insert. An insert hole is formed in the insert, and is aligned such that the insert hole aligns with the pouring hole.

In another embodiment, a method of manufacturing a shot sleeve for high pressure die casting of aluminum silicon alloys containing 0.40% max Fe and having an erosion resistant material at an impingement site includes providing a high pressure die casting shot sleeve constructed of conventional material. The shot sleeve is generally cylindrical in shape, has a length, and includes a pouring hole extending from an outer surface through to an inner surface with an impingement site located opposite the pouring hole on the inner surface of the shot sleeve. The impingement site is covered with an erosion resistant material that prevents erosion from the aluminum silicon alloys through insolubility in molten aluminum. The erosion resistant material may be at least 80% of any one of the following elements: titanium, tungsten, molybdenum, ruthenium, tantalum, niobium, chromium vanadium, zirconium, hafnium, boron or rhenium.

The step of covering the impingement site with an erosion resistant material may also include depositing the erosion resistant material on the inner surface of the shot sleeve. This depositing may be accomplished though spray welding the erosion resistant material to the inner surface, by circular welding the erosion resistant material to the inner surface, or by laser welding powdered erosion resistant material to the inner surface of the shot sleeve and at least at the impingement site.

The step of covering the impingement site with an erosion resistant material may also include casting an insert of erosion resistant material, the insert having an inner surface, an outer surface, and a diameter defined by the outer surface, removing material from the inner surface of the high pressure die casting shot sleeve constructed of conventional material such that a diameter defined by the inner surface of the high pressure die casting shot sleeve corresponds to the diameter defined by the outer surface of the insert, and introducing the insert into the inner surface of the high pressure die casting shot sleeve constructed of conventional material such that impingement site is on the insert. The step of introducing may include press fitting the insert into the inner surface of the high pressure die casting shot sleeve.

The step of covering the impingement site with an erosion resistant material may also include cutting the shot sleeve longitudinally at a first location circumferentially distal to the pouring hole and at a second location circumferentially opposite to the first location. In this embodiment, the cuts may extend along the length of the sleeve to separate the shot sleeve into halves. This results in a first half that is a top portion and a second half that is a bottom portion, and the bottom portion includes the impingement site. The bottom portion is separated from the top portion, and the erosion resistant material is deposited on the inner surface of the bottom portion of the shot sleeve. The bottom portion including the erosion resistant material is then fastened to the top portion.

DETAILED DESCRIPTION OF DRAWINGS

Figure 1:
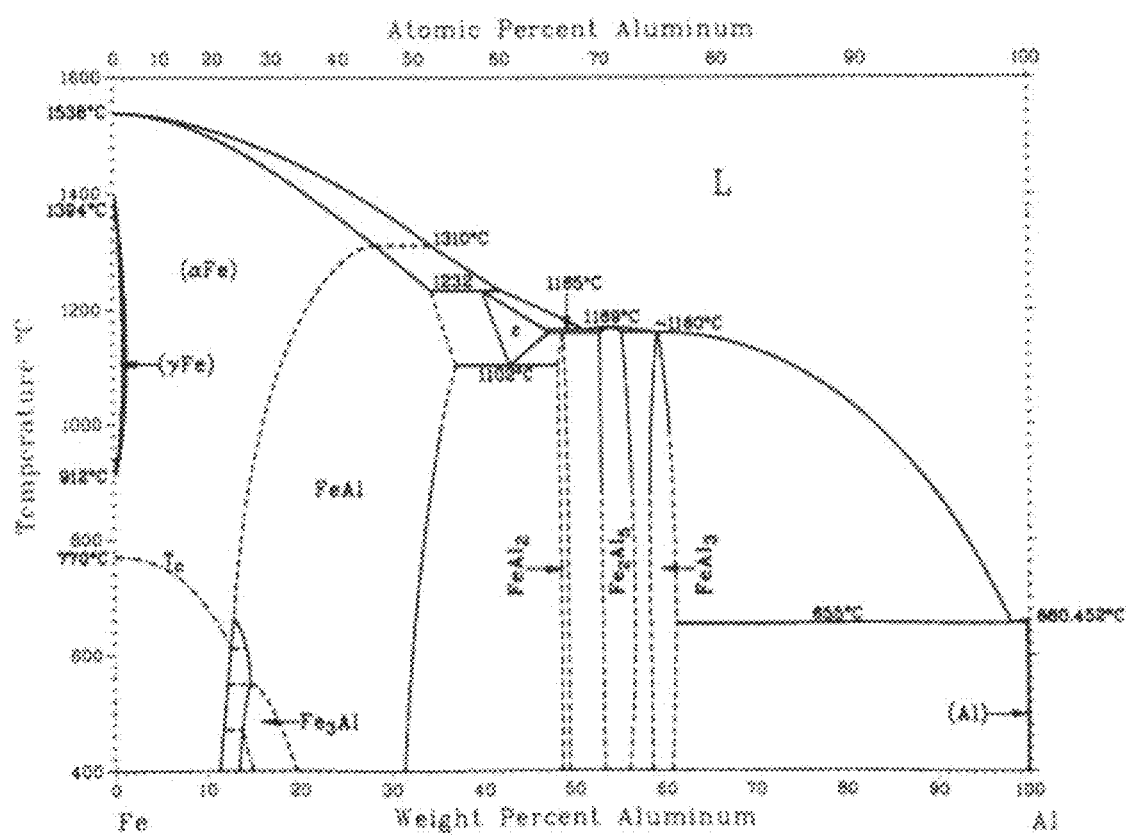
FIG. 1 is the Al—Fe phase diagram demonstrating that the eutectic at the aluminum end of the diagram has molten aluminum with about 2% iron dissolved in solution.

In traditional molten Al—Si alloys, the aluminum constituency diffuses into the iron based (i.e. steel) shot sleeve alloy at temperatures at least above the aluminum-iron eutectic temperature of about 655° C., and frequently even above that temperature. Thus, when a molten Al—Si alloy interacts with a steel shot sleeve, the aluminum concentration at the shot sleeve interface with the molten aluminum will increase because a series of solid Fe—Al intermetallic compounds form. The presence of any of the iron intermetallic compounds on the steel shot sleeve surface is an indication that a reaction occurred between the aluminum and steel. As shown in FIG. 1, the compounds will form with increasing aluminum content starting with (1) the solid solution alloy FeAl at about 33% Al max; followed by (2) the intermetallic FeAl2 compound at about 48% Al; followed by (3) the Fe2Al5 compound at about 55% Al, and finally (4) the FeAl3 compound forms at about 61% Al. When the aluminum concentration exceeds about 61% aluminum, a liquid aluminum phase forms and washout starts, carrying any formed iron intermetallic compounds away from the impingement site or location under the turbulent flow of the molten alloy. Thus, shot sleeve washout is expected to occur under flow conditions and at temperatures where the eutectic constituent is liquid.

For low iron containing die casting alloys that rely on manganese for their die soldering resistance, the washout problem and die soldering problem is similar, except that washout occurs at a higher temperature due to a higher eutectic liquidus temperature. For low iron containing die casting alloys that rely on strontium for die soldering resistance, the die soldering resistance is provide by the very thin strontium oxide or strontium aluminate film on the molten aluminum. This die soldering resistance is explained in U.S. Pat. No. 7,666,353, incorporated herein by reference. However, because the strontium oxide or strontium aluminate film does not provide a permanent barrier between the shot sleeve and the molten aluminum under turbulent flow conditions, washout remains a problem.

Figure 2:
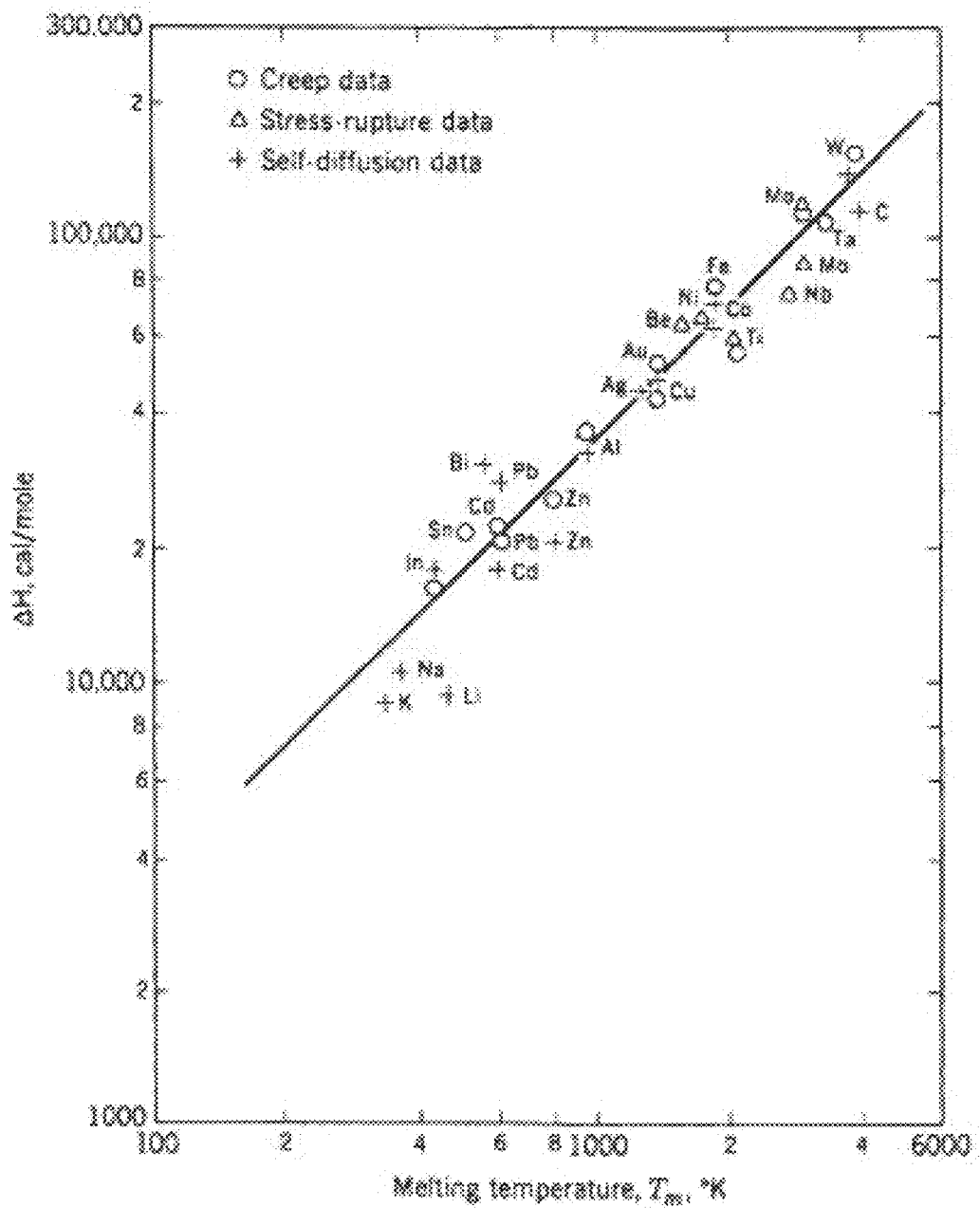
FIG. 2 is a graph demonstrating a linear correlation of activation energies with absolute melting temperature for a large number of metals of various types.

The diffusion rate into aluminum depends on the activation energy for diffusion. As demonstrated in FIG. 2, in a temperature range above 0.5 TMP, the activation energy for creep or stress rupture has been found to be the same as for self-diffusion for a large number of metals of various types.

Refractory metals having very high melting points are used herein to replace iron in shot sleeves or dies as erosion resistant material. The solubility of a refractory metal is nearly insoluble in molten aluminum at the peritectic temperature, i.e. a temperature higher than the melting point of aluminum (660° C.) and therefore also higher than the eutectic temperature of 655° C. in the Al—Fe phase diagram of FIG. 1. Since activation energies for self-diffusion are so high, diffusion and alloying of the refractory metals in aluminum at 660° C. is low. In other words, the diffusion rate of aluminum in any of the refractory metals at a peritectic temperature will be much slower than with iron because the activation energy for diffusion for any refractory metals is significantly higher than that for iron.

Additional self-diffusion activation energies of various refractory metals are as follows:
Activation energy for Self-Diffusion of titanium, $Q(Ti)=$ 60 kcal/mole
Activation energy for Self-Diffusion of zirconium, $Q(Zr)=$ 65.2 kcal/mole
Activation energy for Self-Diffusion of hafnium, $Q(Hf)=$ 88.4 kcal/mole
Activation energy for Self-Diffusion of vanadium, $Q(V)=$ 94.1 kcal/mole
Activation energy for Self-Diffusion of niobium, $Q(Nb)=$ 104.7 kcal/mole
Activation energy for Self-Diffusion of tantalum, $Q(Ta)=$ 98.7 kcal/mole
Activation energy for Self-Diffusion of chromium. $Q(Cr)=$ 104 kcal/mole
Activation energy for Self-Diffusion of molybdenum, $Q(Mo)=131.2$ kcal/mole
Activation energy for Self-Diffusion of tungsten, $Q(W)=$ 159.1 kcal/mole Refractory metals have the highest activation energies, and therefore must have low values for the diffusion rate, since the diffusion rate obeys the relationship $D=A e-Q/RT$, where Q is the activation energy, R is the gas constant, T is the absolute temperature, and A is a constant. Thus, at the melting point of aluminum at 660° C. and above up to the peritectic temperature, the solubility of a refractory metal in molten aluminum exhibits very little solubility. This means that relative to the aluminum-iron diffusion couple for a given concentration level of aluminum, e.g. 61% Al, the time for the aluminum to diffuse and reach 61% at the interface in the aluminum-refractory metal diffusion couple will be substantially longer than for the time for diffusion of an aluminum-iron diffusion couple. Since refractory metals exhibit very little solubility in molten aluminum at 660° C. and higher, the aluminum composition for the free energy curve of the intermetallic refractory metal compound closest to aluminum end of the phase diagram has to be higher that 610% aluminum.

Figure 4:
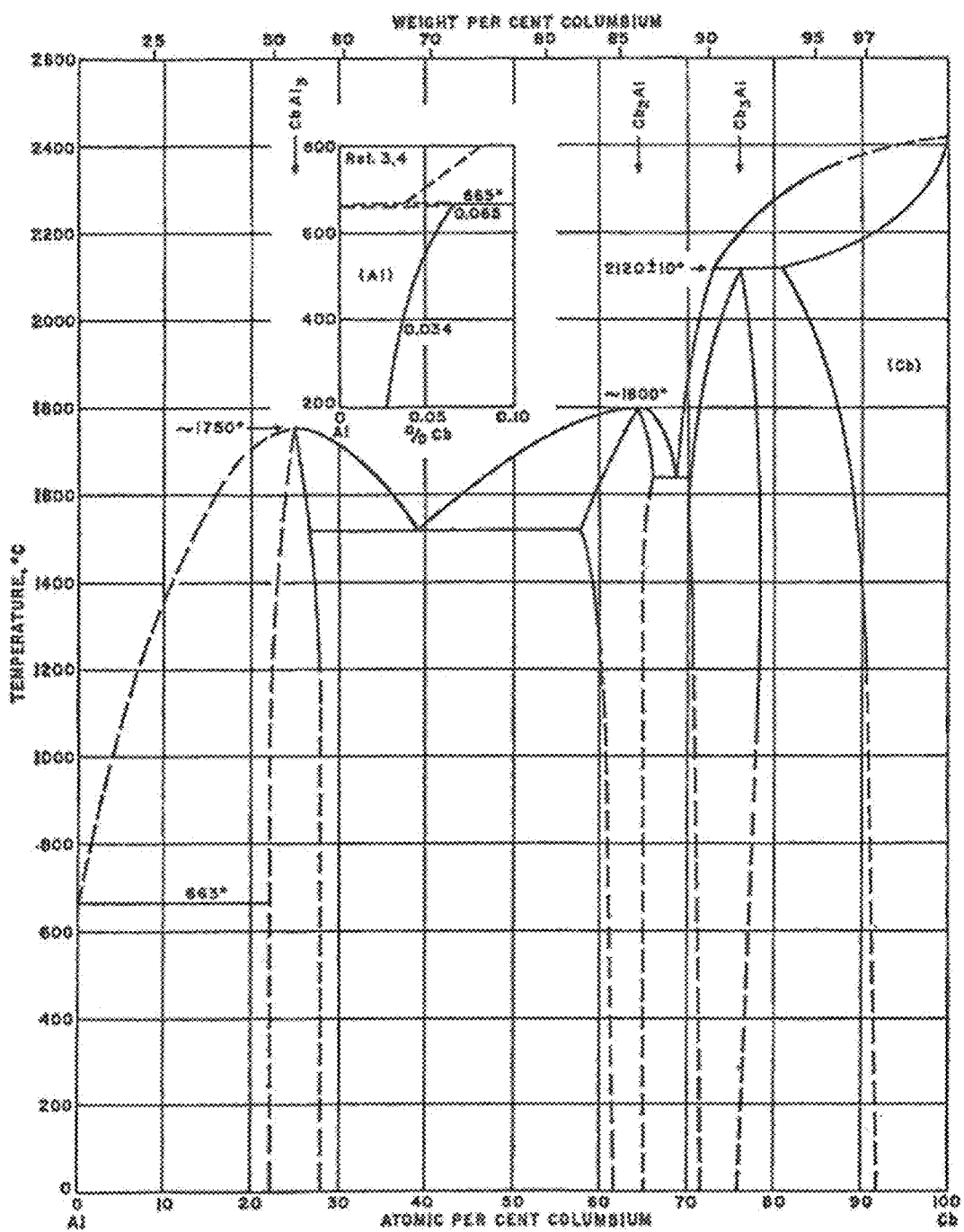
FIG. 4 is the Al—Nb (Aluminum-Niobium/Colunbium) phase diagram, exhibiting zero solubility in aluminum at 660° C. and the peritectic reaction at the peritectic temperature of 663° C.
Figure 5:
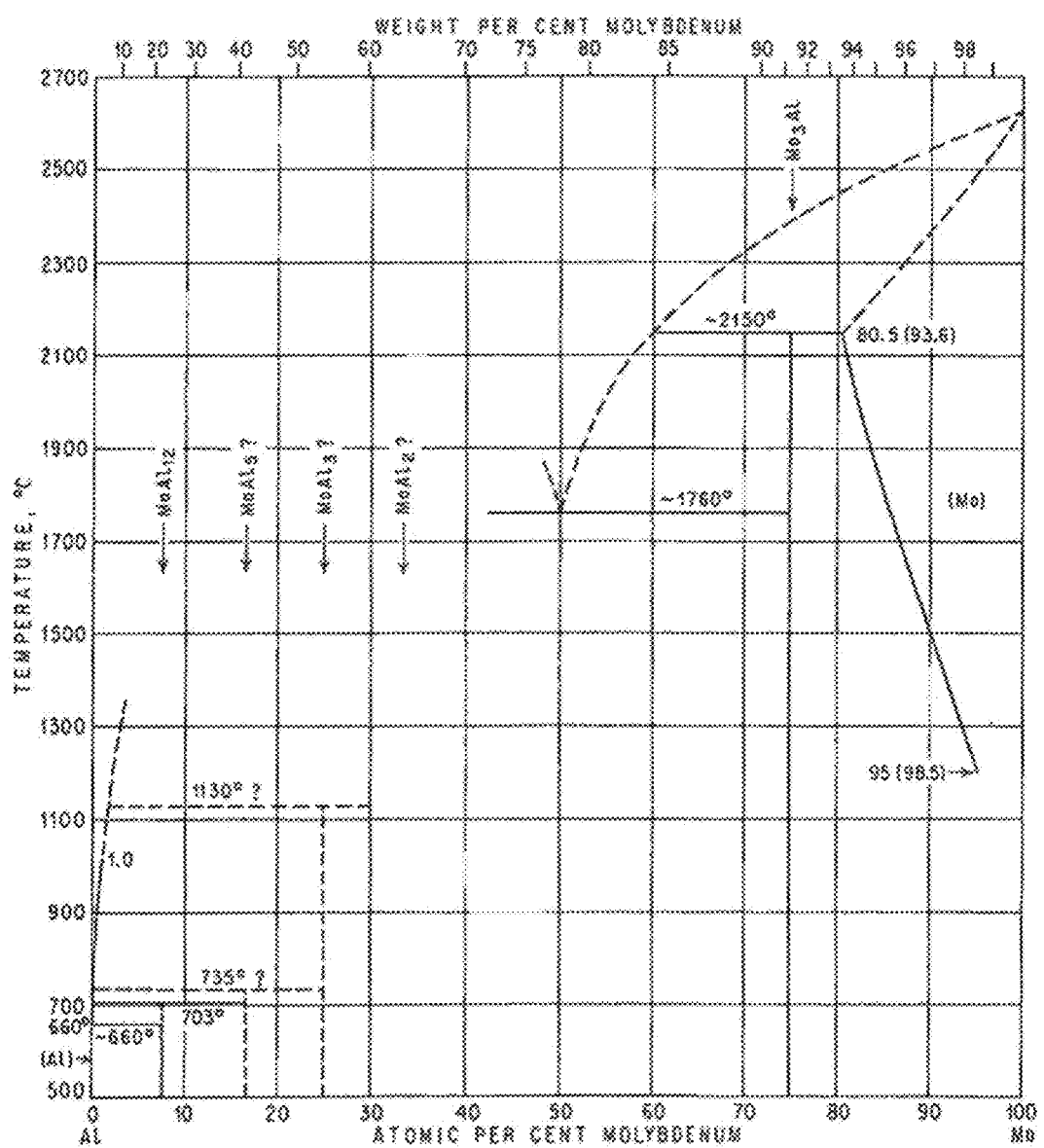
FIG. 5 is the Al—Mo phase diagram, exhibiting zero solubility in aluminum at 660° C. and the peritectic reaction at the peritectic temperature of slightly above 660° C.
Figure 6:
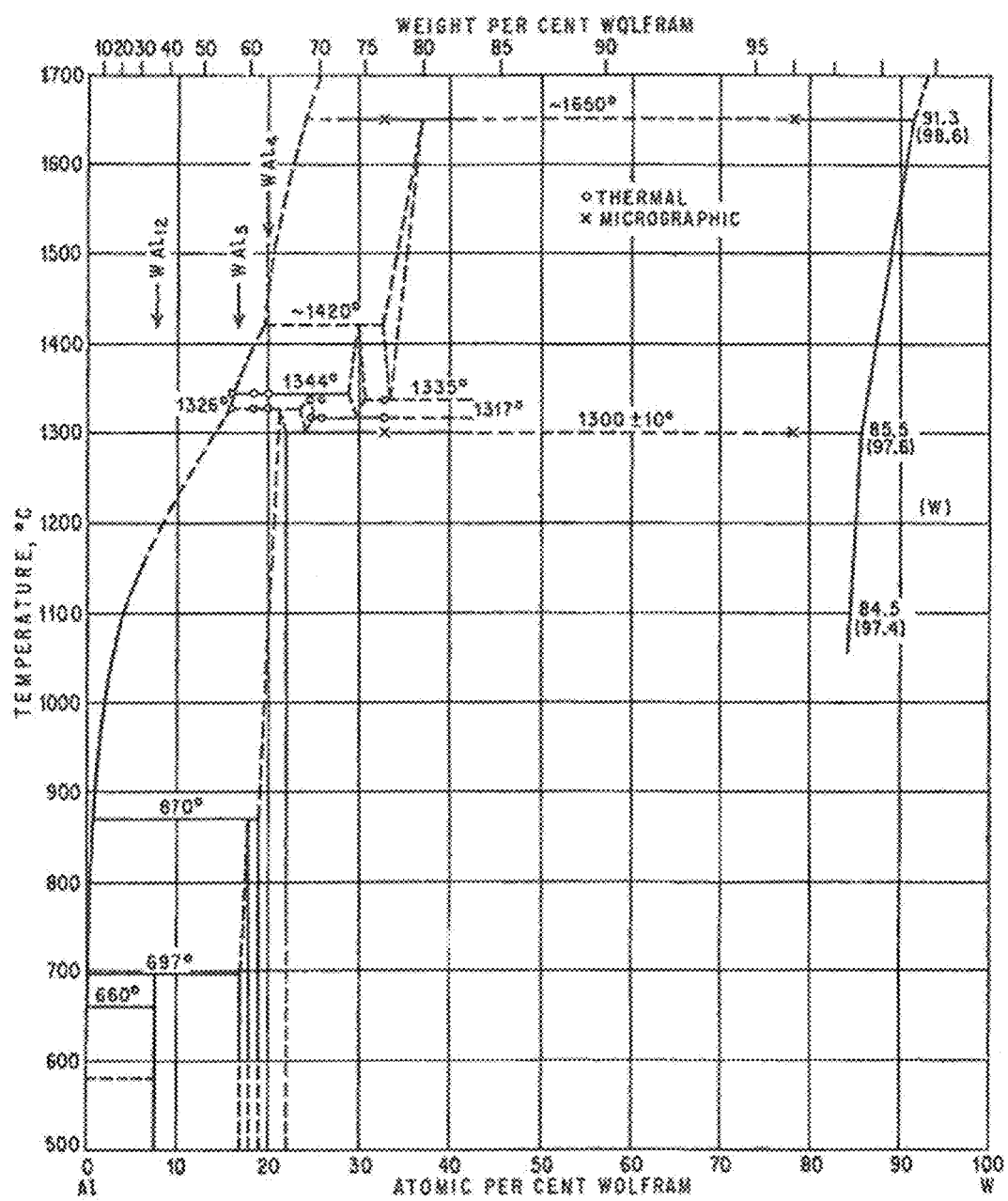
FIG. 6 is the Al—W phase diagram, exhibiting zero solubility in aluminum at 660° C. and the peritectic reaction at the peritectic temperature of 697° C.
Figure 7:
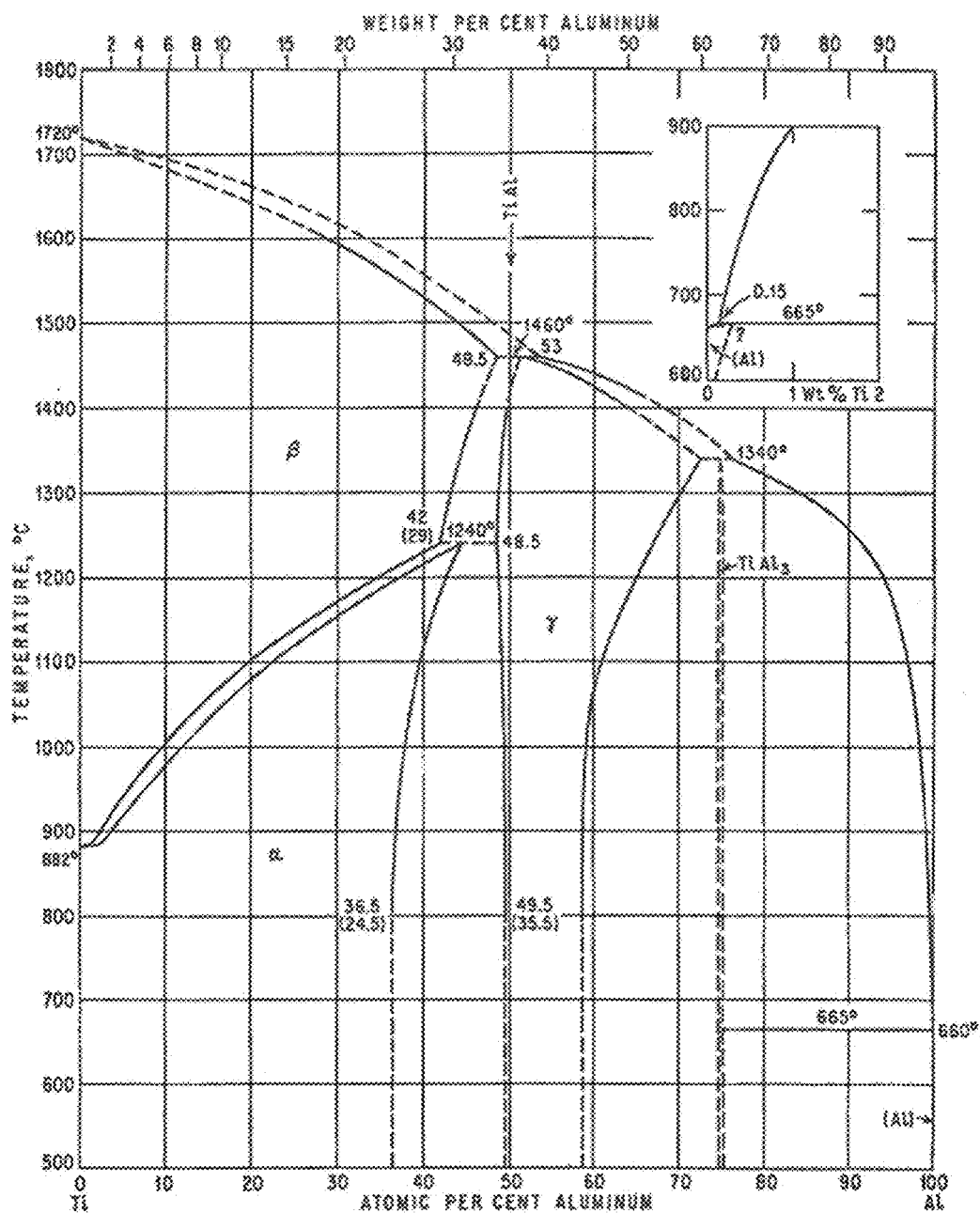
FIG. 7 is the Al—Ti phase diagram, exhibiting zero solubility in aluminum at 660° C. and a peritectic reaction at the peritectic temperature of 665° C.
Figure 8:
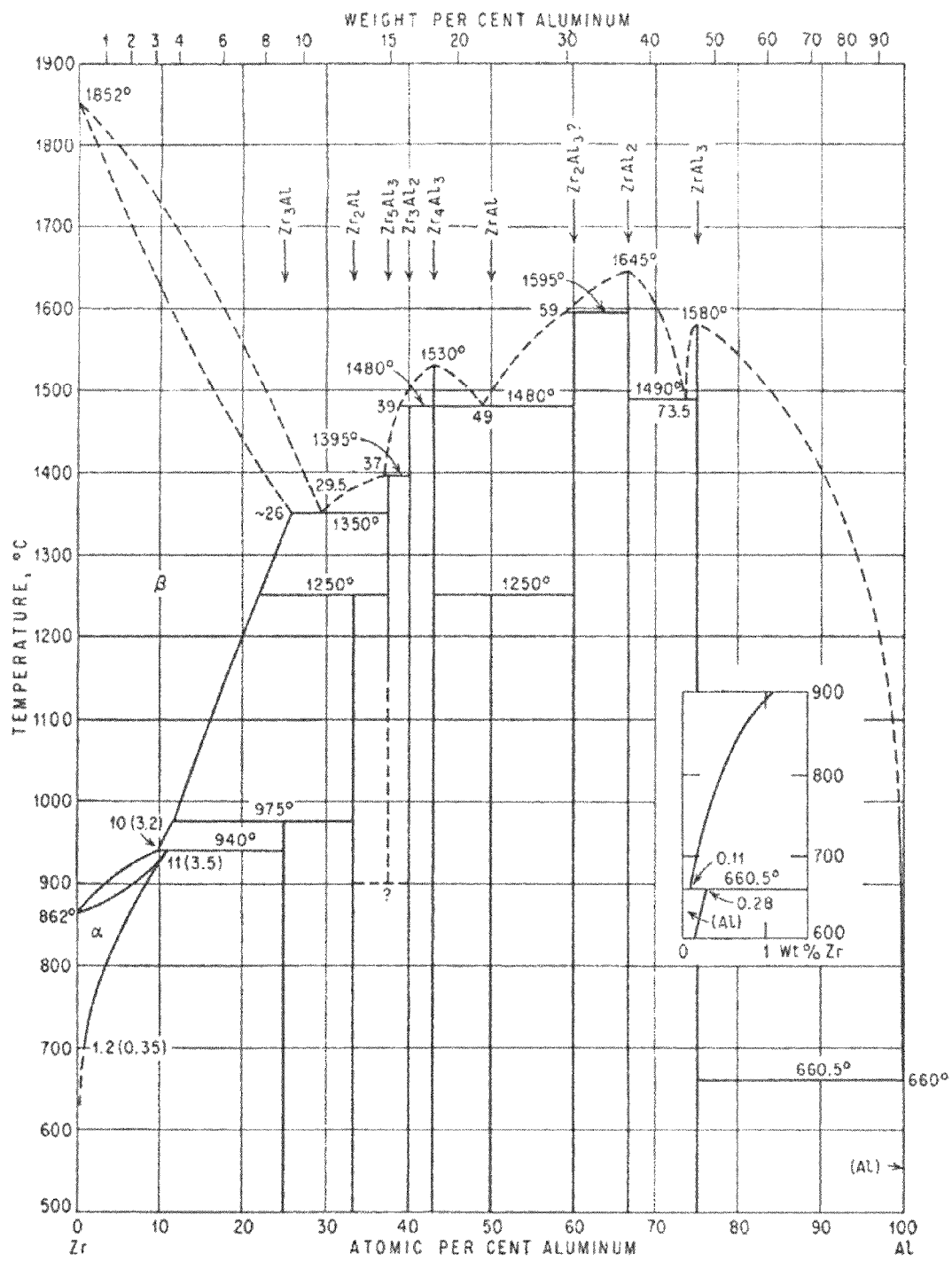
FIG. 8 is the Al—Zr phase diagram, exhibiting zero solubility in aluminum at 6600° C. and a peritectic reaction at the peritectic temperature of 660.5° C.
Figure 9:
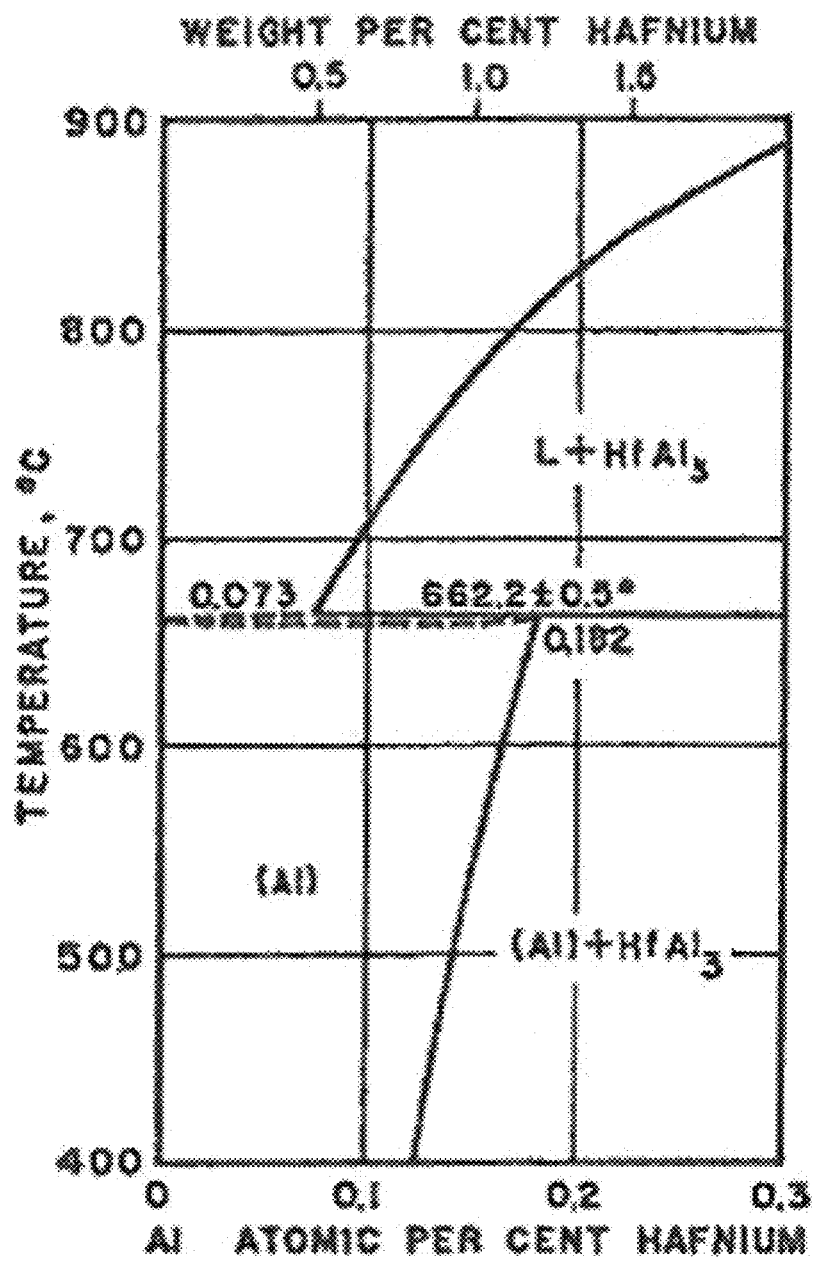
FIG. 9 is the Al—Hf phase diagram, exhibiting 0.073 atomic % solubility in aluminum at 662° C. and the peritectic reaction of liquid [with 0.073% [if in solution]+ HfAl3>Al (with 0.182% Hf in solid solution] at the peritectic temperature of 662.2° C.
Figure 10:
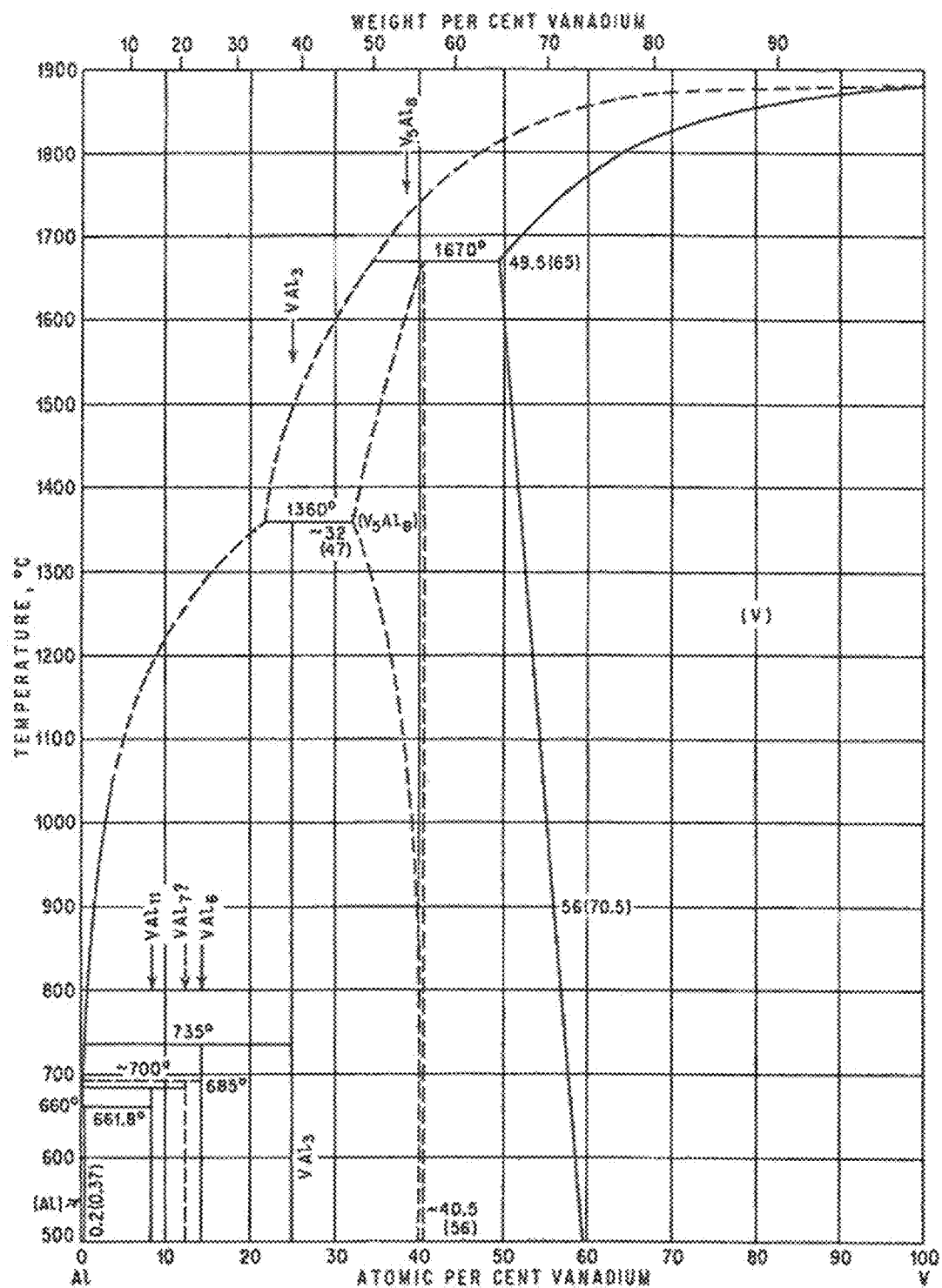
FIG. 10 is the Al—V phase diagram, exhibiting zero solubility in aluminum at 660° C. and the peritectic reaction at the peritectic temperature of 661.8° C.
Figure 11:
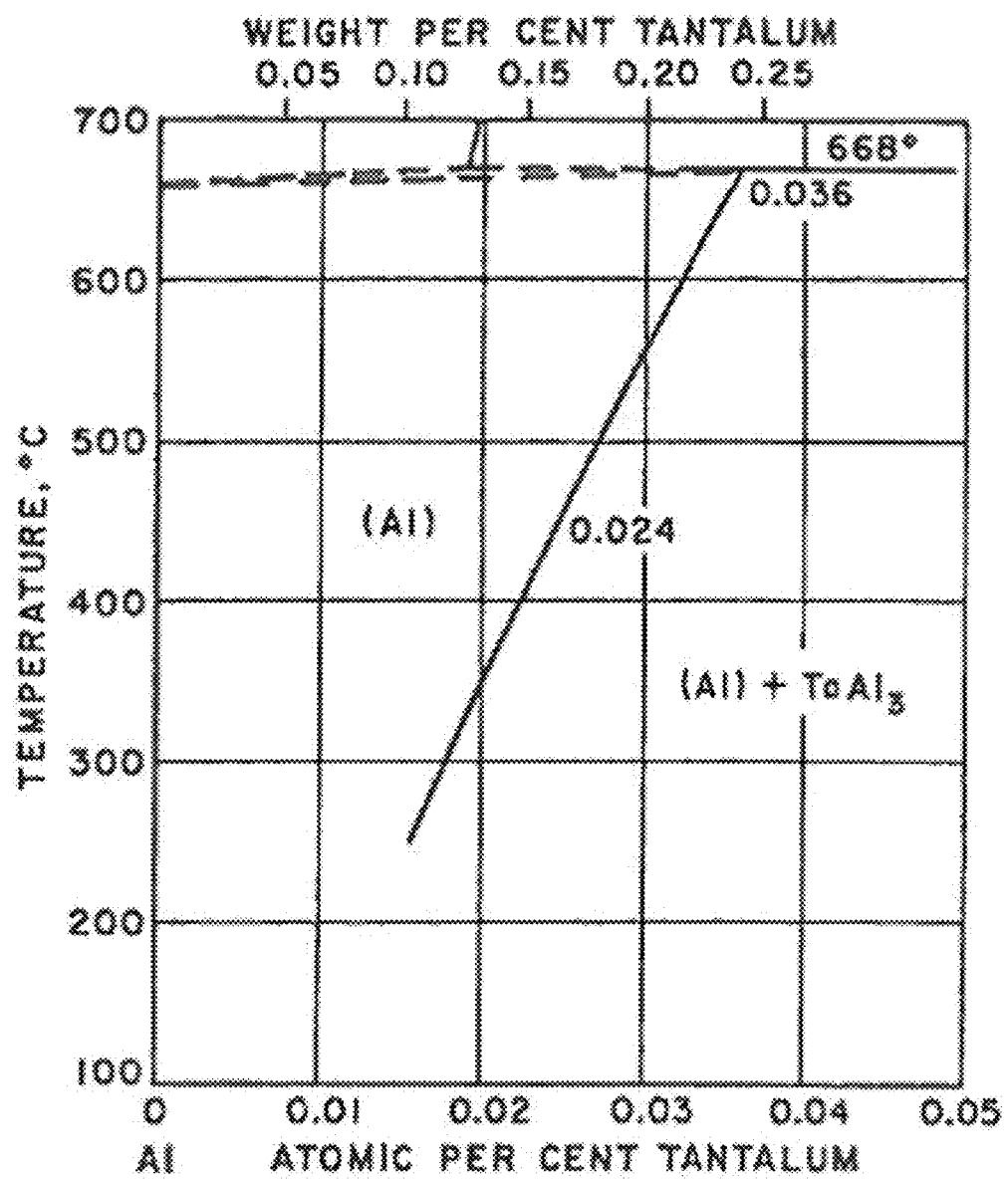
FIG. 11 is the Al—Ta phase diagram, exhibiting less than 0.02 atomic % solubility in aluminum at 660° C. and the peritectic reaction of liquid aluminum [with 0.02% Ta in solution]+TaAl3>solid Al [with 0.036% Ta in solid solution], at the peritectic temperature of 668° C.
Figure 12:
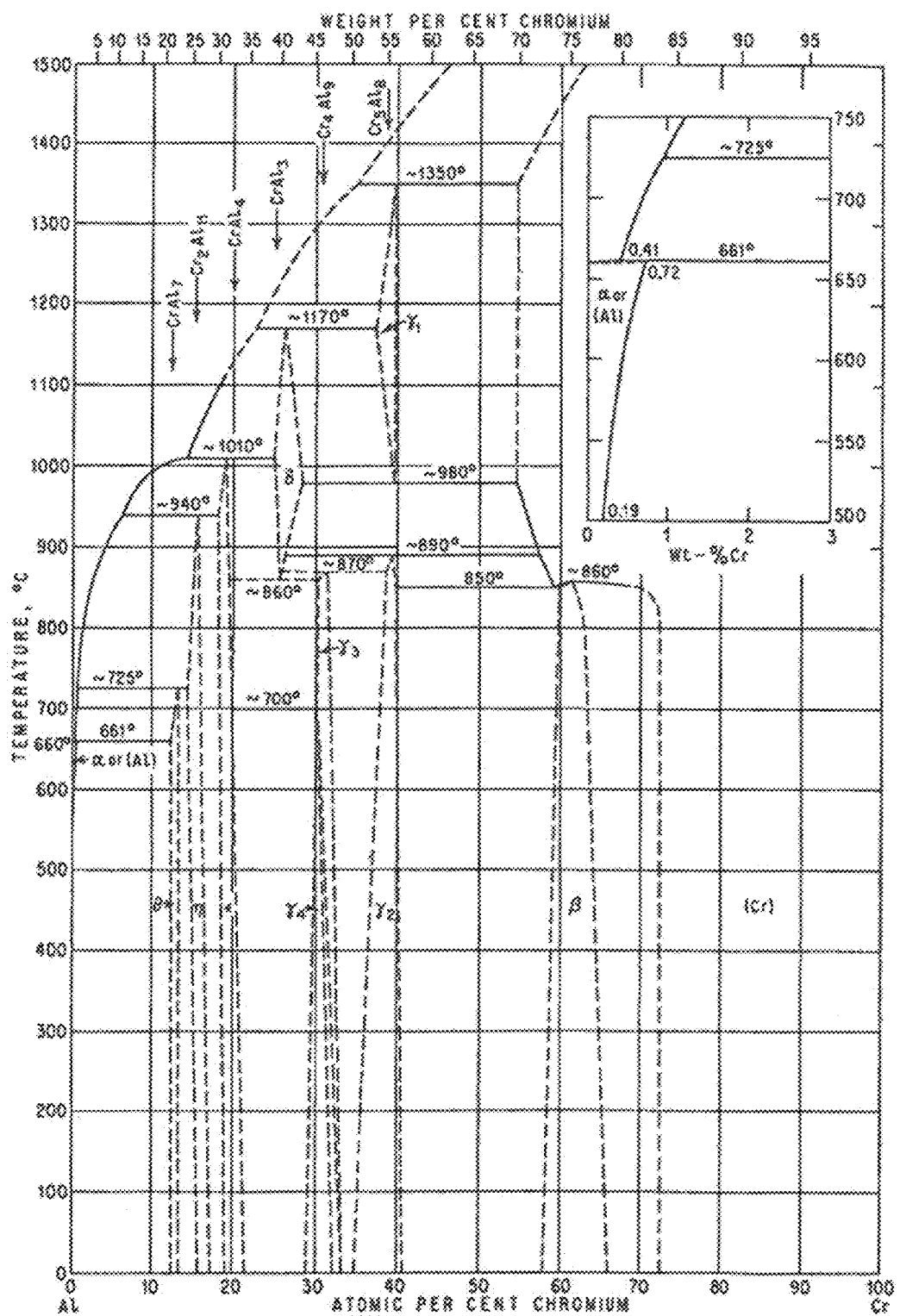
FIG. 12 is the Al—Cr phase diagram, exhibiting zero solubility in aluminum at 660° C. and the peritectic reaction at the peritectic temperature of 661° C.
Figure 13:
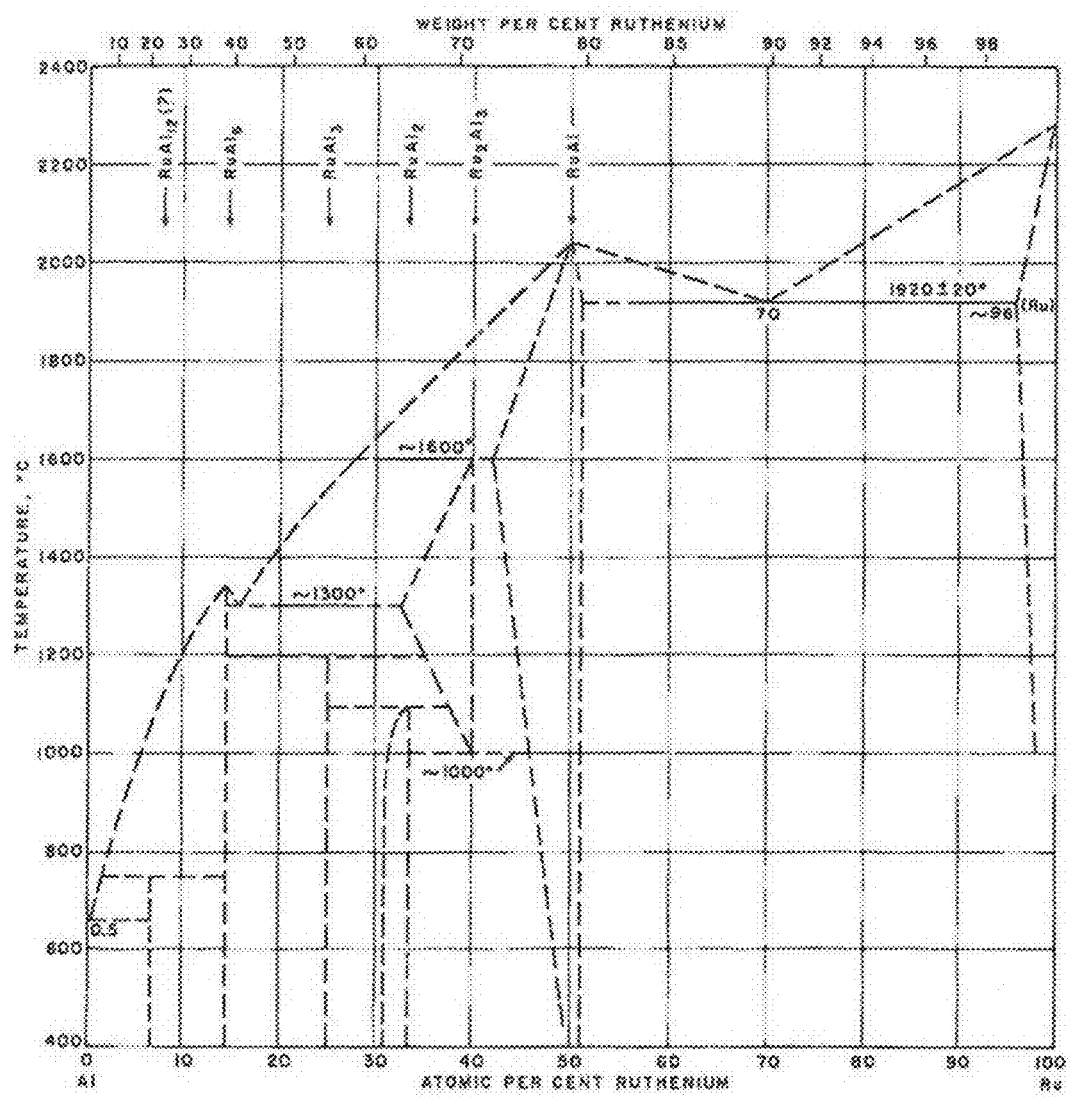
FIG. 13 is the Al—Ru phase diagram, exhibiting 0.5% solubility in aluminum at 660 C.°.

Turning now to FIGS. 4-6, the aluminum composition for the niobium intermetallic phase closest to the aluminum end of the Al—Nb diagram is 78% aluminum, while in the Mo and W intermetallic phases the aluminum composition of the intermetallic phase closest to the aluminum end is 92% aluminum. Thus, for aluminum to diffuse into each of these refractory metals and reach a high enough concentration value to be in equilibrium with the aluminum liquid phase at the peritectic temperature, the aluminum concentration has to exceed the 61% aluminum threshold established by the aluminum-iron phase diagram. Moreover, the time for aluminum to diffuse to higher levels of 78% and 92% is longer. This means that shot sleeves constructed with refractory metals are erosion resistant because of the slower rate of diffusion of aluminum and because the diffusion of aluminum has to occur to higher concentration levels. Above these aluminum concentration levels at the aluminum interface with the shot sleeve, washout in the shot sleeve starts because the liquid interface has no tensile strength with the solid intermetallic compounds that previously formed in the shot sleeve.

The peritectic reaction for refractory metals occurs at temperatures above the melting point of aluminum (660° C.), therefore on cooling from the peritectic temperature an almost pure liquid aluminum reacts with the intermetallic compound of the refractory metal nearest the aluminum end of the phase diagram. When this occurs, a solid solution aluminum alloy having a composition between the liquid phase and intermetallic phase—the peritectic composition— is formed. At this point, the intermetallic phase is isolated from the liquid phase by the peritectic composition phase which acts as a barrier coating between the liquid phase and the intermetallic compound of the refractory metal.

With the peritectic reaction between aluminum and refractory metal shot sleeves there is no liquid phase below the melting point of aluminum. However, in the eutectic reaction between aluminum and iron based shot sleeves such liquid phases exist. Thus, with the refractory metals peritectic reaction, it is unexpectedly discovered that there can be no die soldering below the melting temperature of aluminum because die soldering requires a liquid phase to penetrate between the intermetallic compound phase and bond; and washout cannot occur either below the melting point of aluminum because a liquid phase cannot form.

Accordingly, and referring to FIGS. 4-15, for the refractory metal to be an acceptable erosion resistant material applicable in the present application, the peritectic composition of the "aluminum–erosion resistant material" phase diagram should be at the aluminum end of the phase diagram with the "liquid+aluminum" field as small as possible. Moreover, the slope of the liquidus temperature with increasing erosion resistant material should be high, on the order of 1000 C/atomic % cited metal. With the improved shot sleeve design of the present application, and the metal with the above cited attributes, prevention of erosion due to alloying of a shot chamber constructed of H-13 tool steel or an equivalent steel alloy, such as DIEVAR™ or QRO-90™ is accomplished.

While the entire shot sleeve could be made of a selected erosion resistant metal, this would be a prohibitively expensive solution. Alternatively, the present application contemplates a redesigned shot chamber. Turning to FIGS. 16-20, the modified shot chamber sleeve 2 starts with a conventional tool steel shot sleeve 4. As can been seen from FIG. 17 and FIG. 19, the shot chamber sleeve has an outer surface 40 defining an outer diameter and an inner surface 42 defining an inner diameter 22. The conventional tool steel shot sleeve 4 may be subsequently split longitudinally along split lines 6, 8, leaving the top section 10, including the pouring hole 12 for the molten metal, unmodified. A transverse split line 7 may be added to define a terminal end of a bottom portion 14. Thus the longitudinal split lines 6, 8 and the transverse split line may define bottom portion 14. The pouring hole extends through the outer surface 40 to the inner surface 42 of the shot sleeve 2 such that molten metal poured therethrough will impinge at a location on the inner surface 42 of the bottom portion 14 opposite the pouring hole 12. Thus, the bottom section 14 comprises a curved wall section 16 that includes the impingement site or location 18 located on the inner surface of the curved wall section 16 of the bottom portion 14 opposite the pouring hole 12. The entire bottom section 14 may be recast in an erosion resistant material as described, herein.

Figure 16:
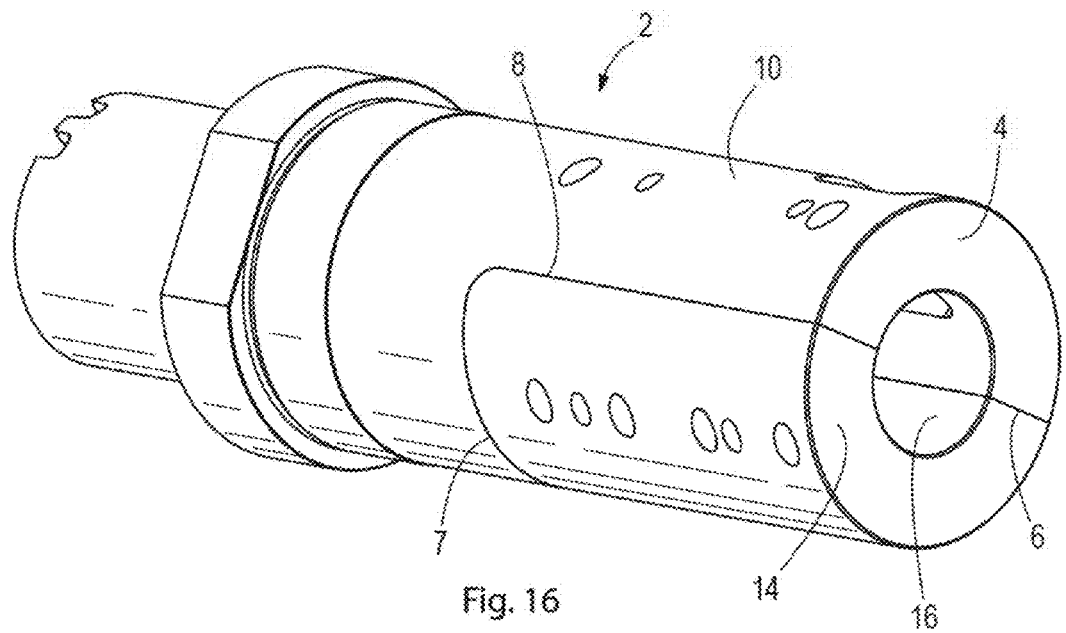
FIG. 16 is a perspective view of a shot chamber sleeve in accordance with the present application, the shot chamber sleeve having a bottom portion of erosion resistant material.

In the embodiment shown in the design in FIGS. 16-19, the top section 10 and modified bottom section 14 constructed of an erosion resistant material are bolted together through the wall thickness of the shot chamber 2. FIG. 16 demonstrates a contemplated shot sleeve design 2 in accordance with the present application. Longitudinal split lines 6, 8 of the shot sleeve 2 extend approximately one third of the length of the shot sleeve 2 to transverse separation line 7 to define the erosion resistant bottom section 14. However, the longitudinal separation line may extend a quarter of the shot sleeve length, or more or less, so long as the impingement site 18 is included in the bottom section 14. Erosion resistant bottom section 14 of the shot sleeve 2 is located where erosion due to the impact impingement of a molten metal stream coming through the pouring hole 12 is at the highest temperature.

Figure 17:
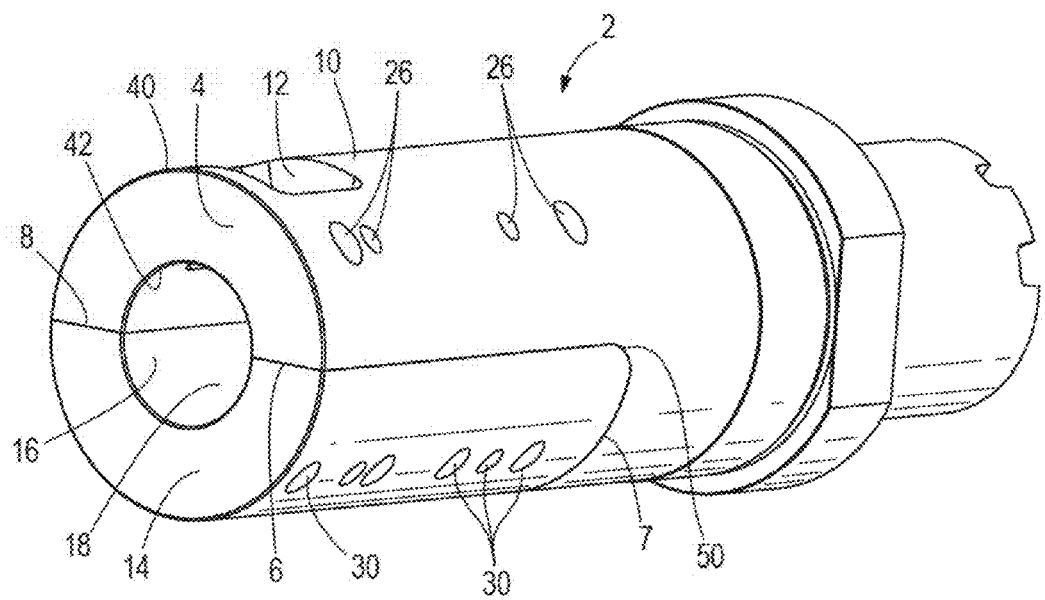
FIG. 17 is a second perspective view of a shot chamber sleeve in accordance with the present application, the shot chamber sleeve having a bottom portion of erosion resistant material.
Figure 18:
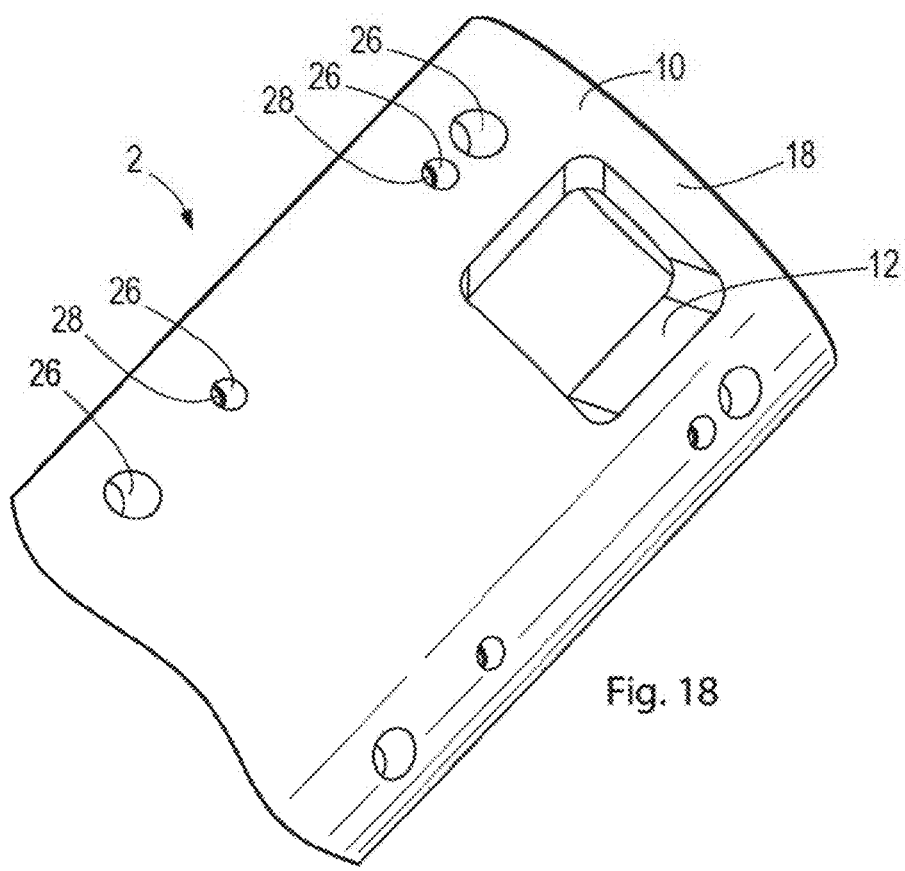
FIG. 18 is a top view of a shot chamber sleeve in accordance with the present application demonstrating a pouring hole and bolt hole locations.
Figure 19:
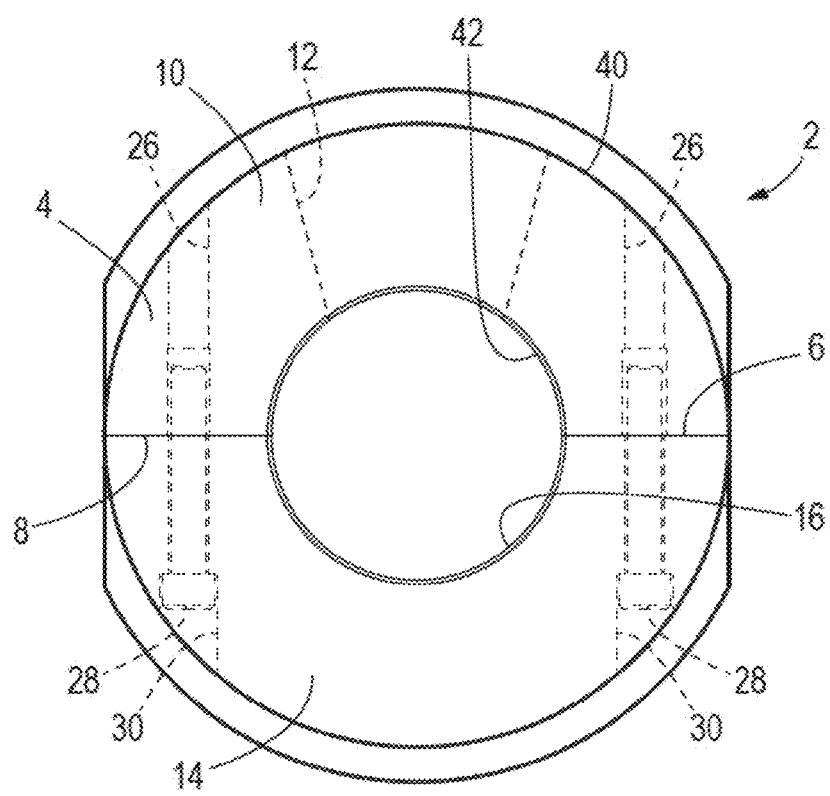
FIG. 19 is an end view of a shot chamber sleeve in accordance with the present application, the shot chamber sleeve having a bottom portion of erosion resistant material.

FIGS. 17-19 illustrates views of an embodiment of a modified shot sleeve 2 in accordance with the present application demonstrating a pouring hole 12, the bolting pattern, and split lines 6, 7 and 8 for separating the upper and lower portions of the shot sleeve. FIGS. 17 and 18 demonstrate bolt holes 26 in the top section 10 for the insertion of bolts 28 or other fasteners to hold the erosion resistant bottom section 14 in place. As shown in FIG. 17, the bottom section 14 also has bolt holes 30 with corresponding bolts or fasteners, for securing the bottom portion 14 to the top portion 10.

Figure 20:
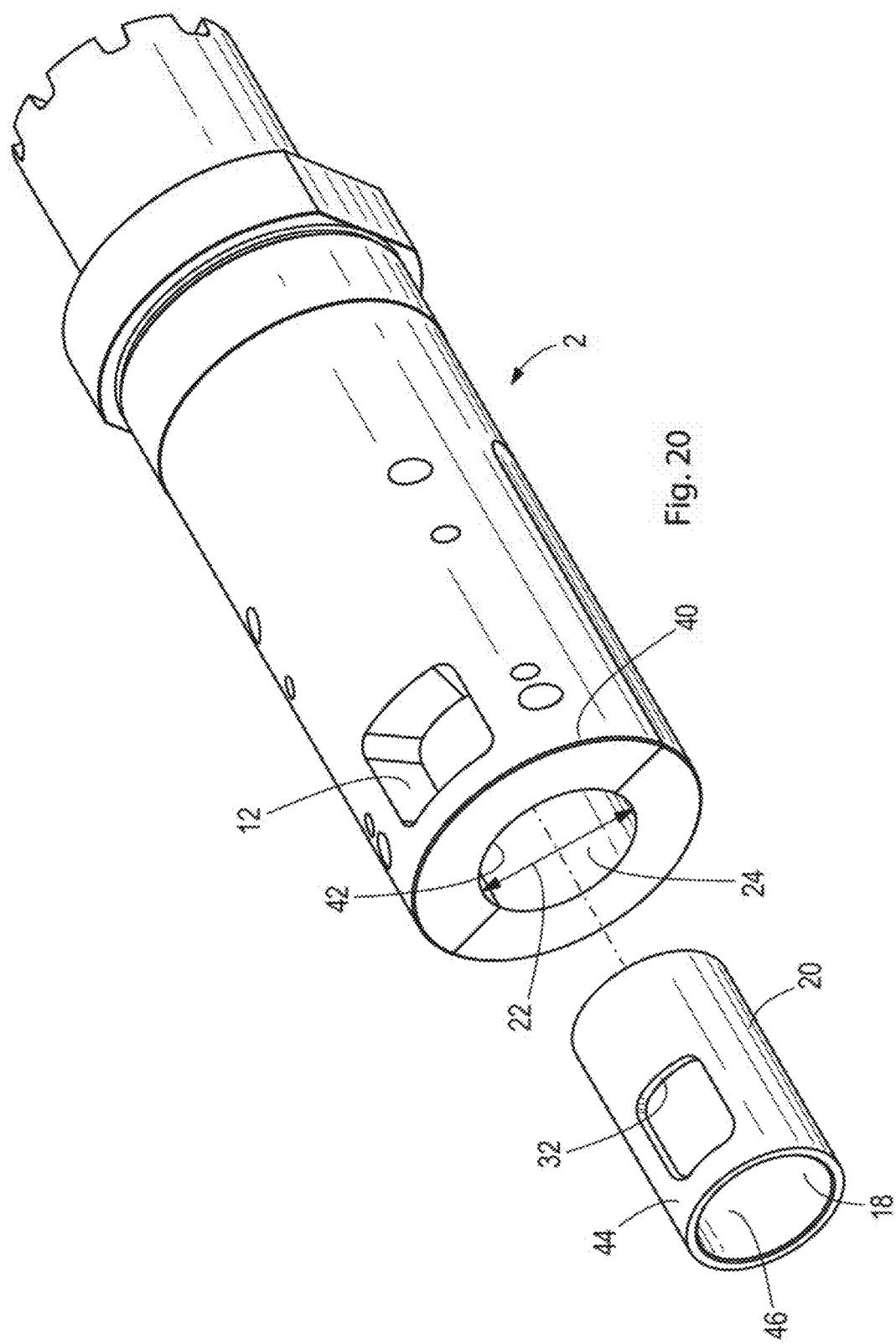
FIG. 20 is a perspective view of a shot chamber sleeve in accordance with the present application, the shot chamber sleeve having an insert of erosion resistant material.
Figure 21:
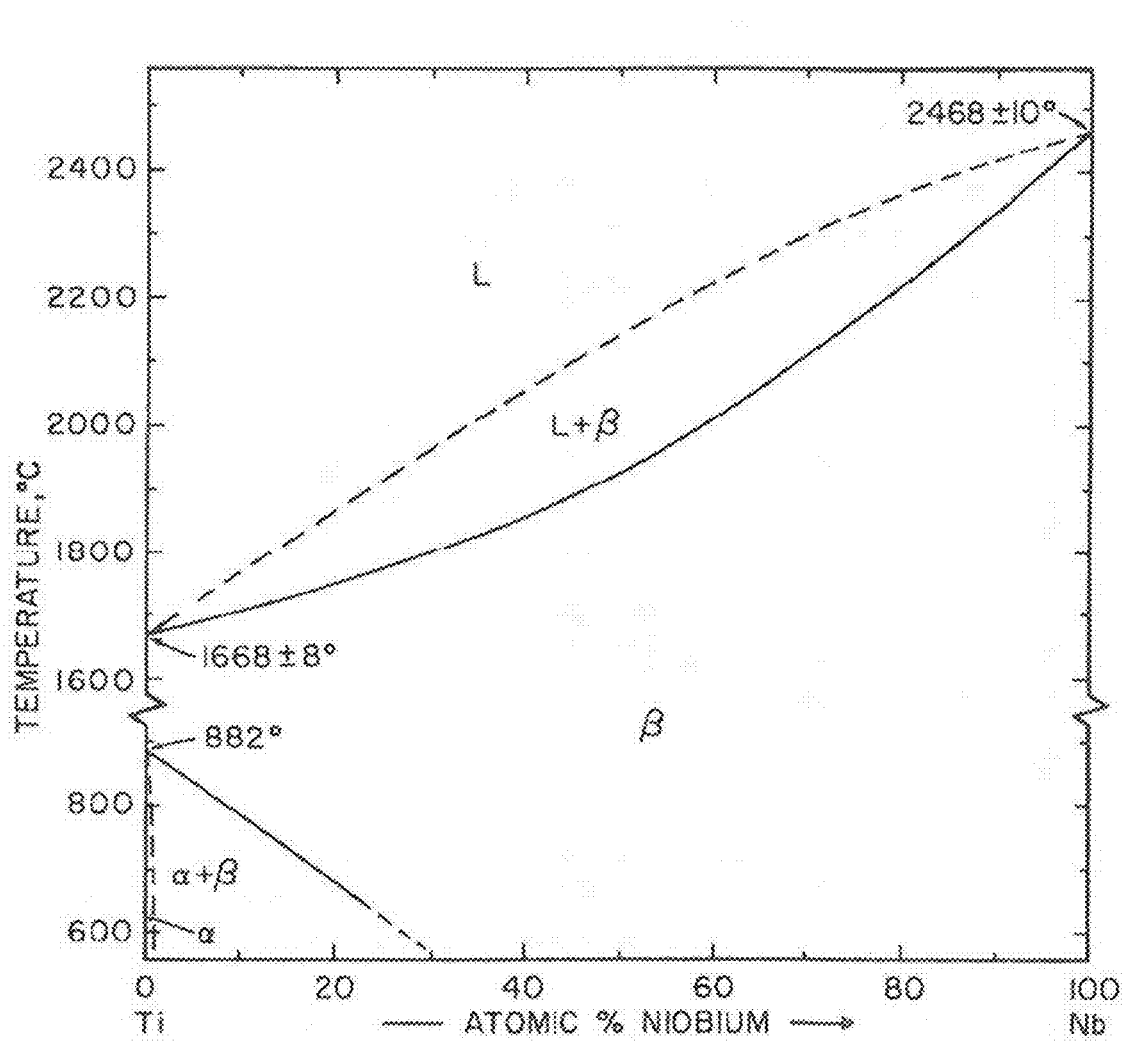
FIG. 21 is the Nb—Ti phase diagram, indicating complete solid solubility above 882° C.
Figure 22:
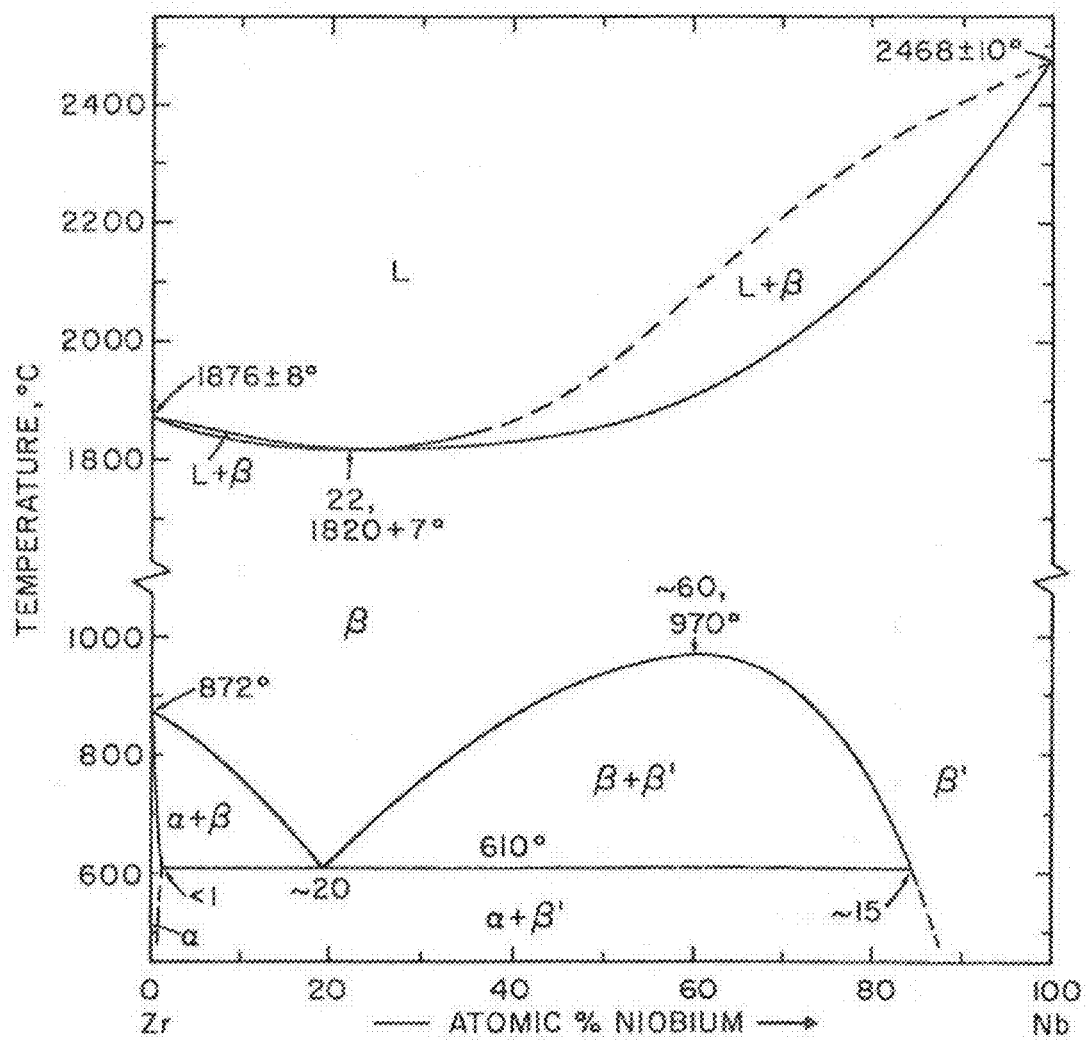
FIG. 22 is the Nb—Zr phase diagram, indicating complete solid solubility above 970 C.
Figure 23:
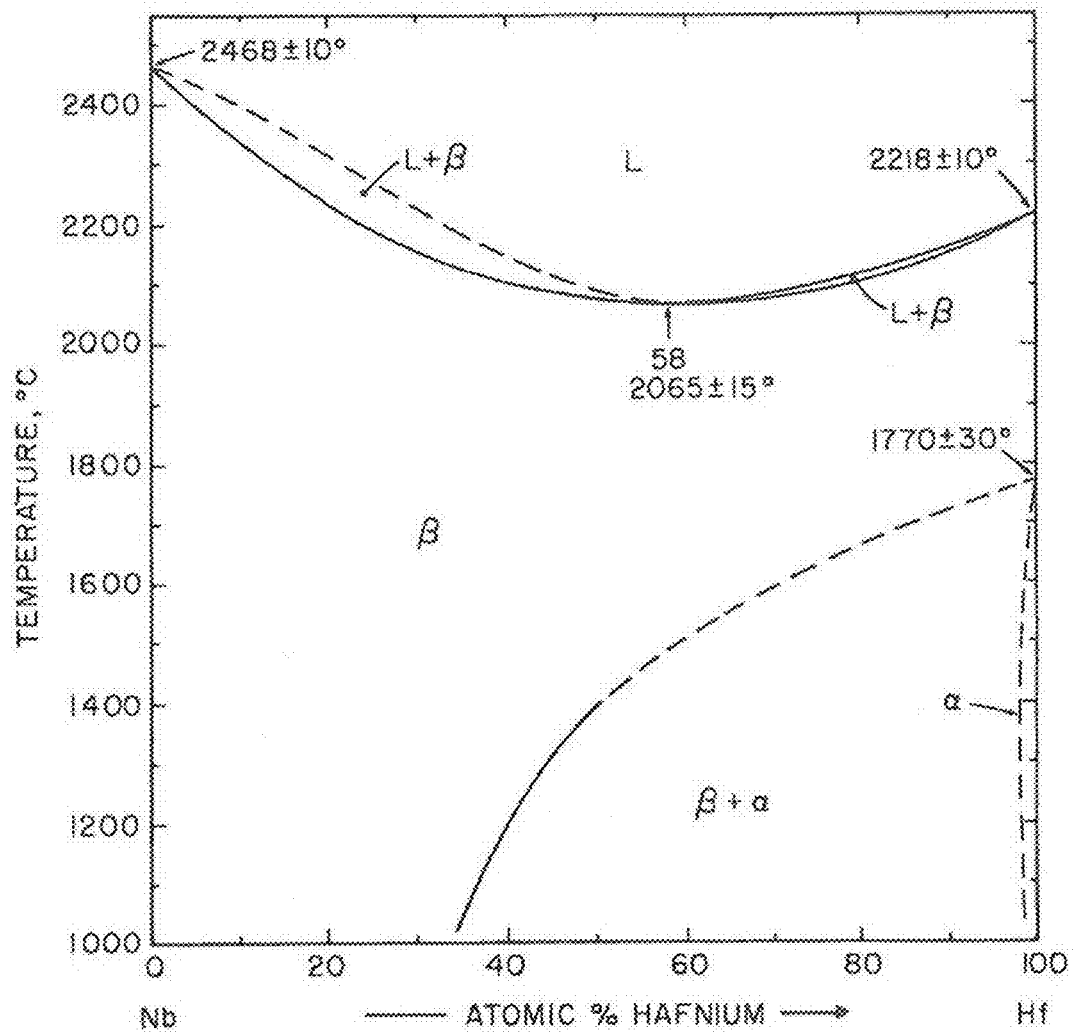
FIG. 23 is the Nb—Hf phase diagram, indicating complete solid solubility above 1770 C.
Figure 24:
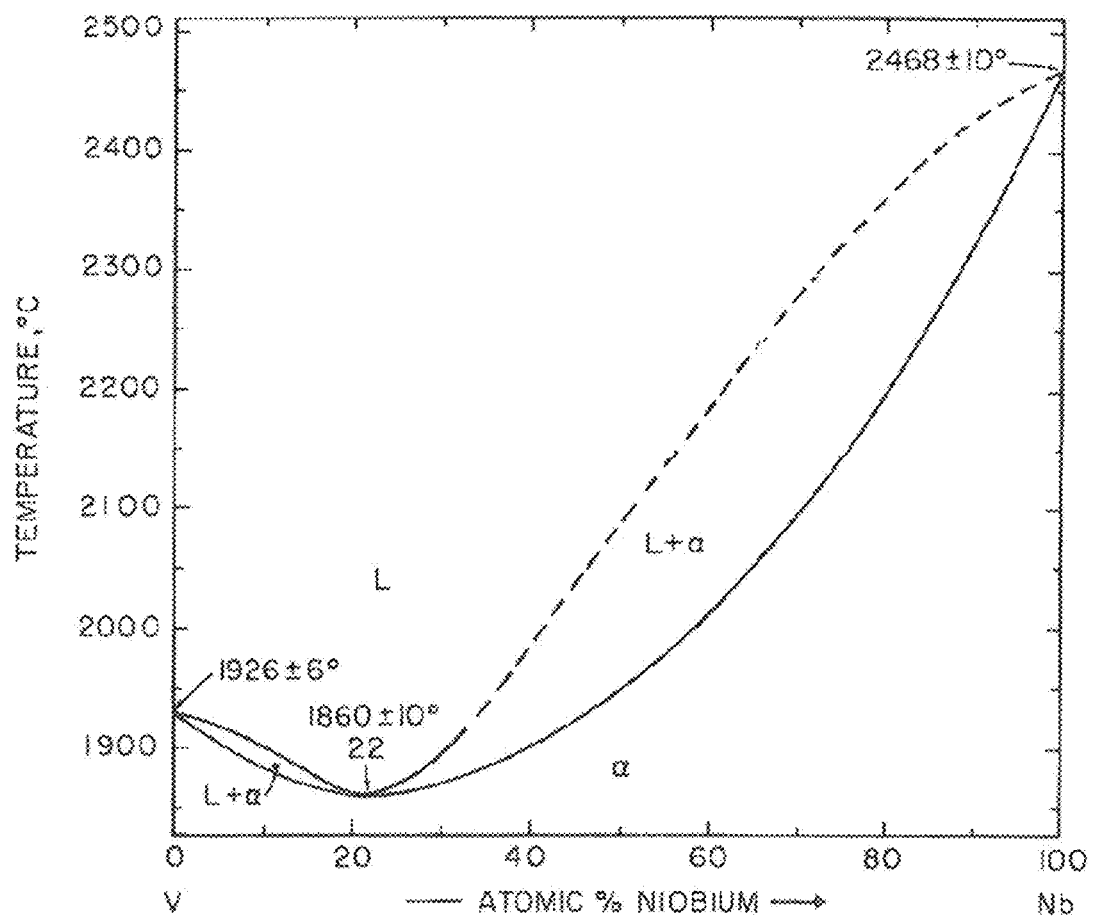
FIG. 24 is the Nb—V phase diagram, indicating complete solid solubility above 1800 C.
Figure 25:
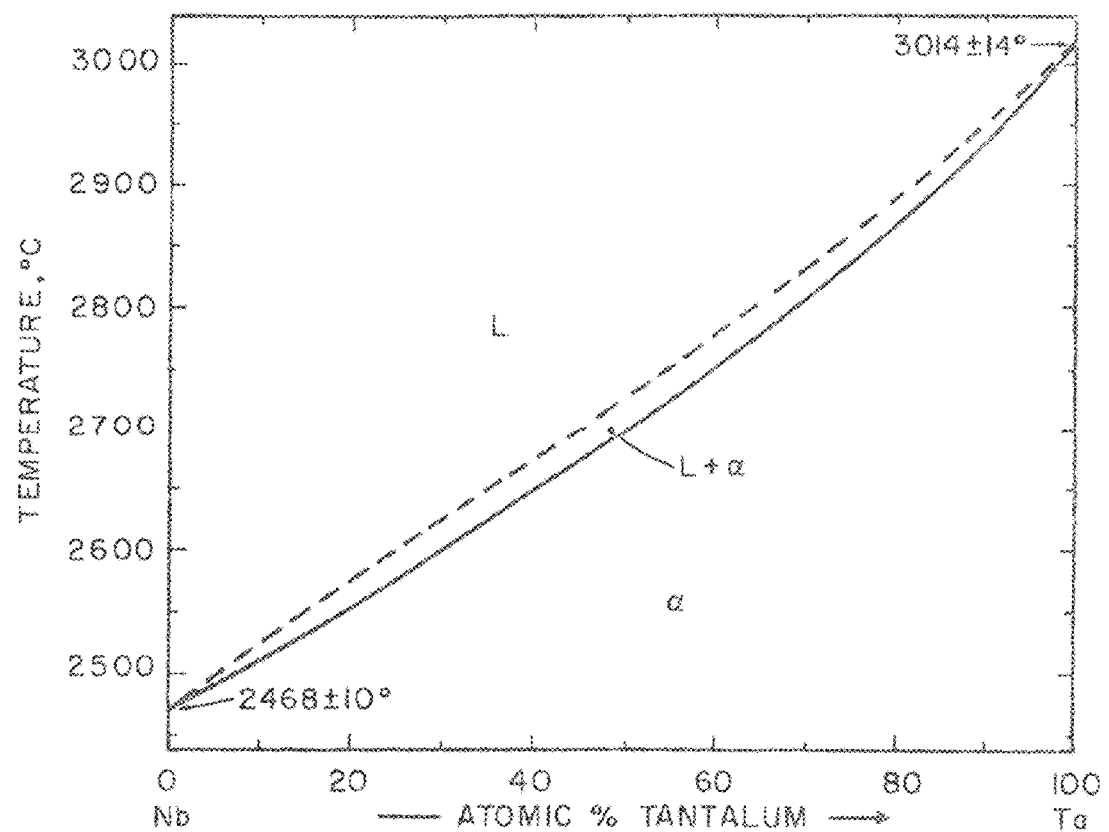
FIG. 25 is the Nb—Ta phase diagram, indicating complete solid solubility above 2400 C.
Figure 26:
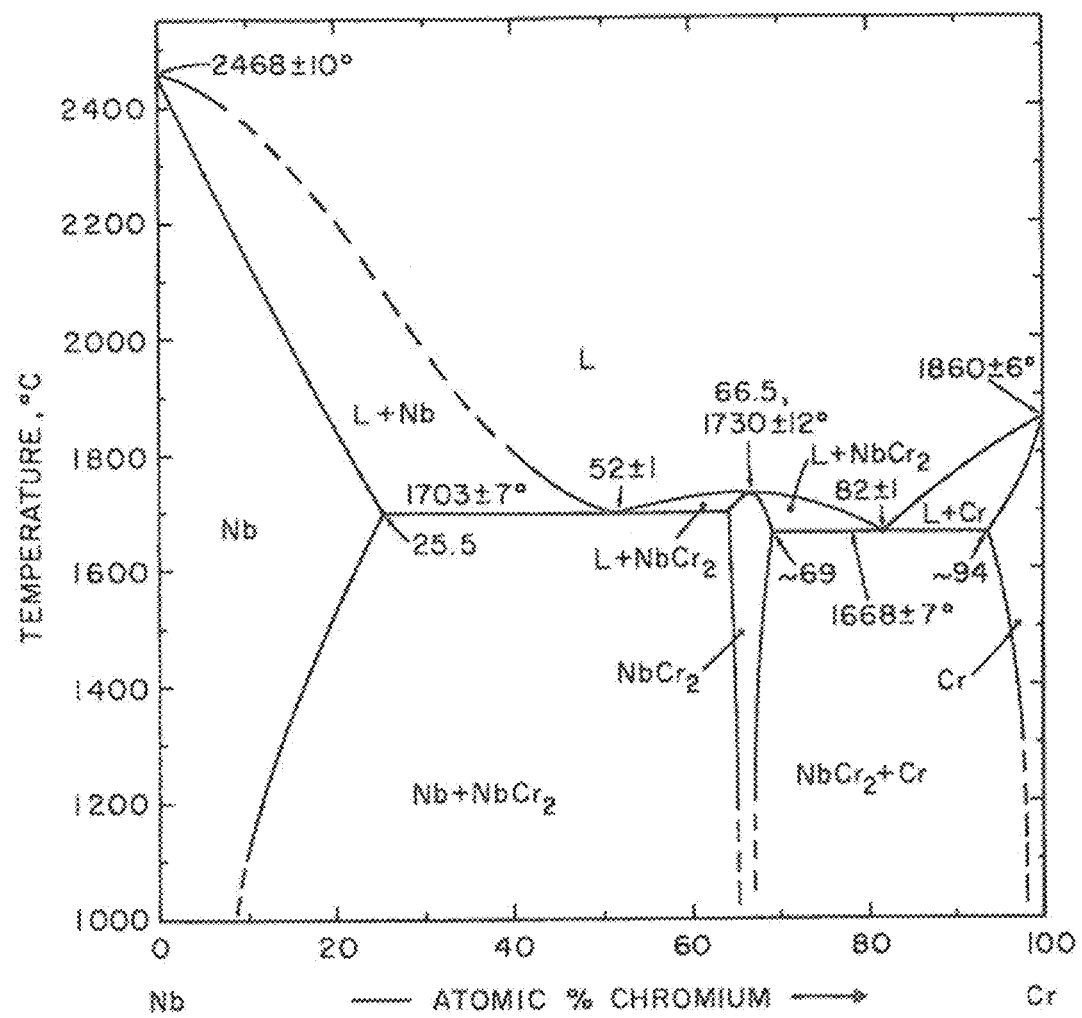
FIG. 26 is the Nb—Cr phase diagram, exhibiting limited solid solubility.
Figure 27:
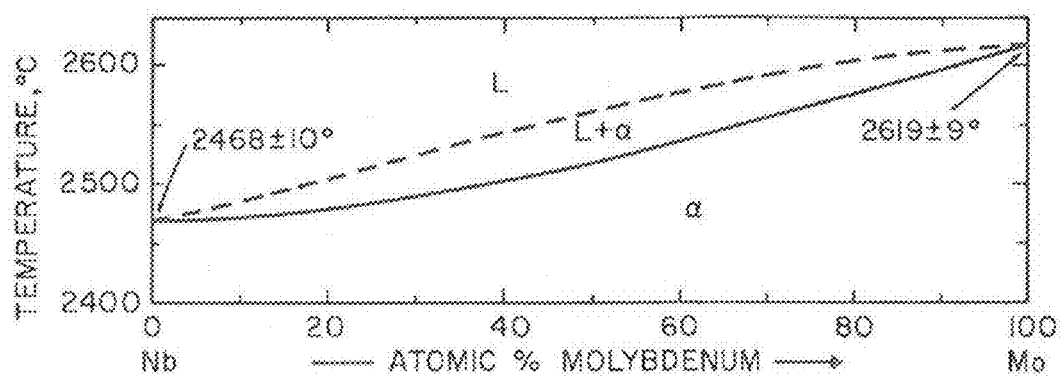
FIG. 27 is the Nb—Mo phase diagram, indicating complete solid solubility above 2400 C.
Figure 28:
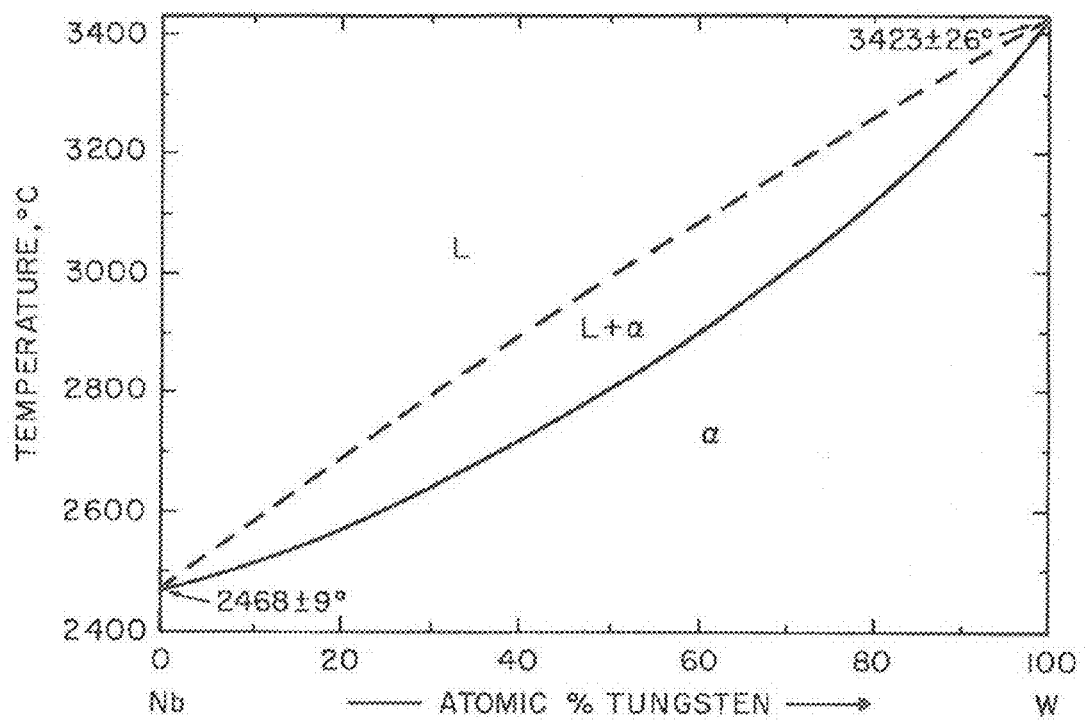
FIG. 28 is the Nb—W phase diagram, indicating complete solid solubility above 2400 C.

Turning to FIG. 20, alternatively an insert 20 may be constructed to replace the tool steel at the impingement site or location 18. In this embodiment, the conventional tool steel on in the inner surface 42 is removed by machining and, in its place, an insert 20 of erosion resistant material matching the inner diameter 22 of the shot sleeve 2 after machining and honing is inserted. The length of the insert 20 may extend the entire bottom portion of the shot chamber 24, or some length less than the entire bottom portion. In one embodiment the length of the insert 20 is one third the length of the length of the shot chamber 24. In another embodiment, length of the insert 20 is between the full length and one third the length of the shot chamber 24. In another embodiment, the length of the insert 20 is less than one third the length of the shot chamber 24. In yet another embodiment the insert 20 is located to cover the entire impingement site or location on the inner surface 42 when pouring occurs. It is contemplated that the insert 20 may be of any thickness, but is preferably at least one centimeter thick. Thus, the entire lower section of the shot sleeve, a portion of the lower section, or alternatively a sprayed coating on the lower section or an in-laid welded rolled product on the lower section, may be used to provide erosion resistance in accordance with the present application.

In the contemplated design of FIG. 20, the inner surface 42 of the shot sleeve 2 is bored out to a larger diameter 22 and the erosion resistant material is a cylindrical insert 20 that is inserted into the shot sleeve. The erosion resistant material insert 20 has an outer surface 44 and an inner surface 46. The outer surface 42 includes a hole 32 that extends through to the inner surface 46 and matches the location of the pouring hole 12 in the shot sleeve 2 such that the impingement site or location 18 is within the insert 20 on the inner surface 46 opposite hole 32. It is contemplated to ease the alignment of the insert hole 32 with the pouring hole 12 of the shot sleeve 2 that the insert 20 be inserted into inner diameter 22 the shot sleeve 2 from the end farthest from a mold cavity. Again, it is contemplated that the insert 20 may be of any thickness, but is preferably at least 1 centimeter thick. In this preferable instance, the inner diameter of the shot sleeve is bored out by at least 1 centimeter.

In another embodiment, the shot sleeve 2 has an impingement site 18 covered with an erosion resistant material that prevents erosion from the aluminum silicon alloys through insolubility in molten aluminum. In one embodiment this covering of the impingement site 18 is accomplished by depositing the erosion resistant material on the inner surface 42 of the shot sleeve 2. This depositing may be accomplished though spray welding the erosion resistant material to the inner surface. This spray welding contemplates conventional spray welding, electroplating or application as a diffusion layer. The depositing of the erosion resistant material may also be accomplished by circular welding the erosion resistant material to the inner surface 42. Such internal circular welding contemplates the use of robots that deposit the erosion resistant material in a continuous or semi-continuous fashion progressively along the inner surface 42, and particularly at least at the impingement site 18. The circular welding deposits are generally $\frac{1}{16}$ to $\frac{1}{4}$ inch thick, but the deposit's thickness may vary. In still another embodiment, the erosion resistant material my be applied by laser welding powdered erosion resistant material to the inner surface 42 of the shot sleeve and at least at the impingement site 18.

The impingement site 18 may also be covered by casting an insert, e.g. 20, of erosion resistant material, and introducing the insert 20 into the inner surface 42 of the high pressure die casting shot sleeve 2 constructed of conventional material. To accomplish this, conventional material of the inner surface 42 of the shot sleeve 2 is first removed, e.g. by bore drilling, such that a diameter 22 defined by the inner surface 42 of the high pressure die casting shot sleeve 2 corresponds to the diameter defined by the outer surface 44 of the insert 20. The insert 20 is introduced into the shot sleeve 2 such that impingement site 18 is located on the inner surface 46 of the insert 20. The step of introducing may include press fitting the insert 20 into the inner surface 42 of the high pressure die casting shot sleeve 2, or may be accomplished in other manners known by those of ordinary skill in the art.

Covering the impingement site 18 with an erosion resistant material may also be accomplished by cutting the shot sleeve 2 longitudinally at a first location circumferentially distal to the pouring hole 12 and at a second location circumferentially opposite to the first location. In this embodiment, the cuts extend along the length of the shot sleeve 2 to separate the shot sleeve into halves where the first half is a top portion and a second half that is a bottom portion that includes the impingement site 18. The bottom portion is separated from the top portion, and the erosion resistant material is deposited on the inner surface 42 of the bottom portion of the shot sleeve 2 at least on the impingement site 18, as described above. The bottom portion including the erosion resistant material is then fastened to the top portion by either welding or bolting the bottom portion to the top portion, or by any other method of fastening known to one of ordinary skill in the art.

The advantage of using the embodiments as discussed above is that the entire shot chamber 2 is not made of the erosion resistant material, only the bottom section insert 14 or the insert 20. The bottom section insert 14 or the insert 20 may be constructed either as a solid piece of the metal with the cited physical and thermodynamic attributes, such as from a rolled product, or as an applied coating, such as sprayed or electroplated, or as a diffusion layer. Further, any bottom section 14 or the insert 20 constructed from the erosion resistant material may be heat treated to provide either higher toughness or lower or higher hardness to further resist and mitigate the effects of the impact of the molten metal on the bottom section 14 or the insert 20.

Further, in instances where the shot sleeve 2 is bored out to a larger diameter 22 as part of a scheduled rejuvenation practice after extensive use in production, then a shot tip that moves the molten metal to the mold cavity is to be replaced with a larger diameter shot tip (not shown). The thickness of any insert 20 should correspond to the shot tip profile after machining and honing so that molten metal can repeatedly and consistently be pushed at high velocity into the mold cavity. Accordingly, with any insert 20 or with any erosion resistant bottom portion 14, there can be no steps along the inside diameter 22 of the assembled shot sleeve to disrupt the action of the shot rod plunger.

To uniquely meet the requirements needed for the redesigned shot sleeve 2 of the present application, the erosion resistant material is insoluble in molten aluminum at 660° C. and also should have metal-like ductility properties, unlike ceramic materials or high temperature intermetallics compounds or composite materials. Although there are a limited number of metals in the periodic table that are ideally suited for the redesigned shot sleeve assembly of the present application that can handle a low iron containing die casting alloy, there are almost an unlimited number of metal alloy combinations that will likely work, as FIGS. 21-28 illustrate by the complete solubility of the refractory metals with each other at high temperatures near the solidus temperature. The inventors have discovered through review and analysis, including a thorough analysis of the binary phase diagrams in "Compendium of Phase Diagram Data" by E. Rudy (Air Force Material Laboratory-TR-65-2-Part V), that certain transition elements in periodic table column 4b (i.e. titanium, zirconium, hafnium), column 5b (vanadium, niobium, tantalum), column 6b (chromium, molybdenum, tungsten), column 7b (technetium, and rhenium, but not manganese), and one element from column 8b (ruthenium) of the periodic table are acceptable. Additionally, all of the recited periodic table elements exhibit complete solid solubility with each other in binary combinations at elevated temperatures approaching the solidus temperatures (see, FIGS. 21-28), but exhibit almost zero solubility with molten aluminum at 660° C. Thus, these twelve identified transition elements and any alloy combinations between any of the identified elements, whether binary, ternary, quaternary or higher ordered combinations, are ideal candidates for the redesigned shot sleeve chamber material.

These twelve transition elements may be deposited on an iron substrate, with a coefficient of expansion of 12.1×10-6/C. However, the deposition must be of sufficient thickness to avoid spalling off the tool iron substrate. If the thickness of the deposition is too thin (generally less than one centimeter in thickness), these identified transition elements will have a high tendency to spall off the iron substrate. This is due to the high and/or very different coefficient of expansion of the iron based substrate at 12.1×10-6/C [and thermal conductivity of 78.2 W/m/C] compared to that of any of the transition elements, which have the following values for the coefficient of expansion:

Titanium 8.9×10-6/C [and thermal conductivity of 21.6 W/m/C]
Zirconium 5.9×10-6/C [and thermal conductivity of 22.6 W/m/C]
Hafnium 6.0×10-6/C [and thermal conductivity of 22.9 W/m/C]
Vanadium 8.3×10-6/C {and thermal conductivity of 31.6 W/m/C]
Niobium 7.2×10-6/C [and thermal conductivity of 54.1 W/m/C]
Tantalum 6.5×10-6/C [and thermal conductivity of 57.6 W/m/C]
Chromium 6.5×10-6/C [and thermal conductivity of 91.3 W/m/C]
Molybdenum 5.1×10-6/C [and thermal conductivity of 137 W/m/C]
Tungsten 4.5×10-6/C [and thermal conductivity of 200 W/m/C]
Manganese 23×10-6 [and thermal conductivity of 7.8 W/m/C]

The heat capacity at 660° C. of the above-identified transition elements is also of salient importance because it represents the amount of heat required to raise the temperature 1 degree C. From Smithells Metals reference book (sixth edition), the following a, b, and c constants in the heat capacity equation $C_p$ [J/K/mole]=4.1868 $(a+10^{-3} \; b \; T+105 \; c/T^2)$ were obtained. The heat capacities that were calculated at 660 C in units of J/K/mole and (J/kg)/K are listed in the two columns of Table 1, below.

TABLE 1

| Element | a | b | c | Cp@660 C. [J/K/mole] | @660 C. Cp/atomic weight [(J/kg)/K] |
|---|---|---|---|---|---|
| Titanium | 5.28 | 2.4 | | 31.48 | 657.2 |
| Zirconium | 5.35 | 2.40 | | 31.77 | 348.2 |
| Hafnium | 5.61 | 1.82 | | 30.59 | 171.4 |
| Vanadium | 4.90 | 2.58 | +0.2 | 30.59 | 600.5 |
| Niobium | 5.66 | 0.96 | | 27.44 | 295.3 |
| Tantalum | 6.65 | -0.52 | -0.45 | 27.84 | 153.9 |
| Chromium | 5.84 | 2.36 | -0.88 | 33.66 | 647.3 |
| Molybdenum | 5.77 | 0.28 | +2.26 × $10^{-6} \; T^2$ | 33.48 | 349.0 |
| Tungsten | 5.74 | 0.76 | | 27.00 | 146.9 |
| Manganese | 5.70 | 3.38 | -0.375 | 23.86 | 434.3 |
| Rhenium | 5.80 | 0.95 | | 27.99 | 150.3 |
| Iron | 8.873 | 1.474 | -56.92/√T | 29.34 | 525.3 |
| Ruthenium | 5.49 | 2.06 | | 31.03 | 306.9 |
| Osmium | 5.69 | 0.88 | | 27.26 | 143.3 |

The elements Ti, V, Cr, Mn, and Fe have an average heat capacity at 660 C of 572.9 (J/kg)/K, with coefficient of variation of 16%. The elements Zr, Nb, Mo, and Ru have an average heat capacity at 660 C of 324.9 (J/Kg)/K, with coefficient of variation of 9% The elements Hf, Ta, W, Re, and Os have an average heat capacity at 660 C of 153.2 (J/kg)/K, with coefficient of variation of 7%. The average heat capacity [J/K/mole] at 660 C for these fourteen elements is 29.52 J/K/mole with a coefficient of variation (standard deviation/average) of 9%. Statistically, a coefficient of variation of 9% would be expected if the heat capacity in J/K/mole of any one of the fourteen elements was measured fourteen times. Therefore, it is unexpected to find all fourteen molar heat capacities approximately the same. This means the trend in the heat capacity in (J/g)/K decreasing by a factor of 3 in going from the row of the periodic table listing Ti, V, Cr, Mn, Fe, to the subsequent row of Zr, Nb, Mo, Ru, to the next subsequent row listing Hf, Ta, W, Re, Os, is due to the trend in the atomic weight.

In calculating the average distance heat flows in an insert material at the impingement location, it is assumed that the pouring event takes approximately five seconds. Further, the average distance x to which heat flows in time t in a material of thermal diffusivity k is x=(k t) ½ where k=K/(ρ Cp) and K is the thermal conductivity in units of W/m/C, ρ is the density in units of kg/m³ and specific heat Cp is in units of (J/kg)/C. Using the densities of the elements and the thermal conductivities and heat capacities from Table 1 above, the thermal diffusivities k in units of m²/s is calculated in the second column from the far right of Table 2. The distance heat travels in 5 seconds in units of meters is calculated in the far right column of Table 2 for the fourteen listed elements. Note by moving the decimal point 3 places to the right, the distance heat travels in 5 seconds can be expressed in millimeters, e.g. x for Ti is 19.1 mm.

TABLE 2

| Metal | K [W/m/C.] | ρ [kg/m³] | Cp[(J/kg)/C.] | k [m²/s] = K/(ρ Cp) | x = (5 k)^{1/2} |
|---|---|---|---|---|---|
| Titanium | 21.6 W/m/C. | 4500 kg/m³ | 657.2 (J/kg)/C. | 0.730 × 10⁻⁵ m²/s | 0.0191 m |
| Zirconium | 22.6 W/m/C. | 6400 kg/m³ | 348.2 (J/kg)/C. | 1.014 × 10⁻⁵ m²/s | 0.0071 m |
| Hafnium | 22.9 W/m/C. | 13300 kg/m³ | 171.4 (J/kg)/C. | 1.005 × 10⁻⁵ m²/s | 0.0071 m |
| Vanadium | 31.6 W/m/C. | 5960 kg/m³ | 600.5 (J/kg)/C. | 0.883 × 10⁻⁵ m²/s | 0.0066 m |
| Niobium | 54.1 W/m/C. | 8400 kg/m³ | 295.3 (J/kg)/C. | 2.181 × 10⁻⁵ m²/s | 0.0104 m |
| Tantalum | 57.6 W/m/C. | 16600 kg/m³ | 153.9 (J/kg)/C. | 2.255 × 10⁻⁵ m²/s | 0.0106 m |
| Chromium | 91.3 W/m/C. | 7100 kg/m³ | 647.3 (J/kg)/C. | 1.987 × 10⁻⁵ m²/s | 0.0100 m |
| Molybdenum | 137 W/m/C. | 10200 kg/m³ | 349.0 (J/kg)/C. | 3.849 × 10⁻⁵ m²/s | 0.0139 m |
| Tungsten | 200 W/m/C. | 19300 kg/m³ | 146.9 (J/kg)/C. | 7.054 × 10⁻⁵ m²/s | 0.0188 m |
| Manganese | 7.8 W/m/C. | 7200 kg/m³ | 434.3 (J/kg)/C. | 0.249 × 10⁻⁵ m²/s | 0.0035 m |
| Rhenium | 47.6 W/m/C. | 21000 kg/m³ | 150.3 (J/kg)/C. | 1.508 × 10⁻⁵ m²/s | 0.0087 m |
| Iron | 78.2 W/m/C. | 7860 kg/m³ | 525.3 (J/kg)/C. | 1.894 × 10⁻⁵ m²/s | 0.0097 m |
| Ruthenium | 116.3 W/m/C. | 12430 kg/m³ | 306.9 (J/kg)/C. | 3.049 × 10⁻⁵ m²/s | 0.0123 m |
| Osmium | 86.9 W/m/C. | 22480 kg/m³ | 143.3 (J/kg)/C. | 2.698 × 10⁻⁵ m²/s | 0.0116 m |
| Ref.: Aluminum | 200 W/m/C. | 2700 kg/m³ | 1000 (J/kg)/C. | 7.407 × 10⁻⁵ m²/s | 0.0192 m |

By adding the inventors' unique insights into the high pressure die casting process, it is realized that the above noted calculations are consistent with the distances that heat flows in the erosion resistant material during the pouring event into the shot sleeve 2, which is about five seconds for large parts. The pouring event into the shot chamber is an aggressive event because the molten metal is at its hottest temperature during this pouring event, and because the metal stream is directed to impact the same impingement location in the shot sleeve with a high heat load every die casting cycle. The heat loading cycle in the sleeve generally follows a pattern of having (a) a very high heat input upon impact from a gravity pouring device at the impingement location during the pouring event for approximately five seconds, followed by (b) a shorter holding time in a half filled shot sleeve of less turbulent molten metal, and finally (c) a cooling time, after the molten metal is injected into the die cavity in 100 milliseconds, of at least ten times the pouring event, while the shot sleeve is empty and waiting for the next cycle to start. During the pouring event into the shot sleeve erosion risk to the shot sleeve is at its highest because conventional tool steel shot sleeve is not designed to manage the high heat loads that occur from the poured molten metal stream of a low iron aluminum silicon alloy. During this time, the heat transfer coefficient is high due to the turbulent conditions created at the impingement location.

To manage the heat loads advantageously, it is informative to know the distance that heat flows in the insert material. For example, if distance that heat flows in the pouring event into the shot sleeve is very limited, then heat is not effectively dispersed to its environment, and hot spots are created. The creation of hot spots results in large expansion of the metal at the contact point, creating conditions conducive to the spall off of any thin coating. Moreover, large stress gradients are created at the interface with the material unaffected by the heat transfer. On the other hand, if the distance that heat flows through the erosion resistant material is large, then heat dispersion will occur over a much large volume. This ultimately results in lower temperatures in and around the impingement location and less damage to the erosion resistant material, particularly any insert of erosion resistant material.

Accordingly, a first group of erosion resistant materials for a modified shot sleeve construction for use with low iron aluminum silicon alloys are titanium, tungsten, molybdenum and ruthenium. This selection recognizes that titanium provides for heat travel of 19.1 mm in 5 seconds; tungsten provides for heat travel of 18.8 mm in 5 seconds; molybdenum provides heat travel of 13.9 mm in 5 seconds; and ruthenium provides for heat travel of 12.3 mm in 5 seconds. A second group of erosion resistant materials for a modified shot sleeve construction for use with low iron aluminum silicon alloys are tantalum (where heat flows 10.6 mm in 5 seconds); niobium (where heat flows 10.4 mm in 5 seconds) and chromium (where heat flows 10.0 mm in 5 seconds). A third group of erosion resistant materials for a modified shot sleeve construction for use with low iron aluminum silicon alloys also have heat traveling less than that of iron in 5 seconds include vanadium (where heat travels 6.6 mm in 5 seconds, i.e. 68% of that of iron); zirconium (where heat travels 7.1 mm in 5 seconds) and hafnium (where heat flows 7.1 mm in 5 seconds).

Figure 14:
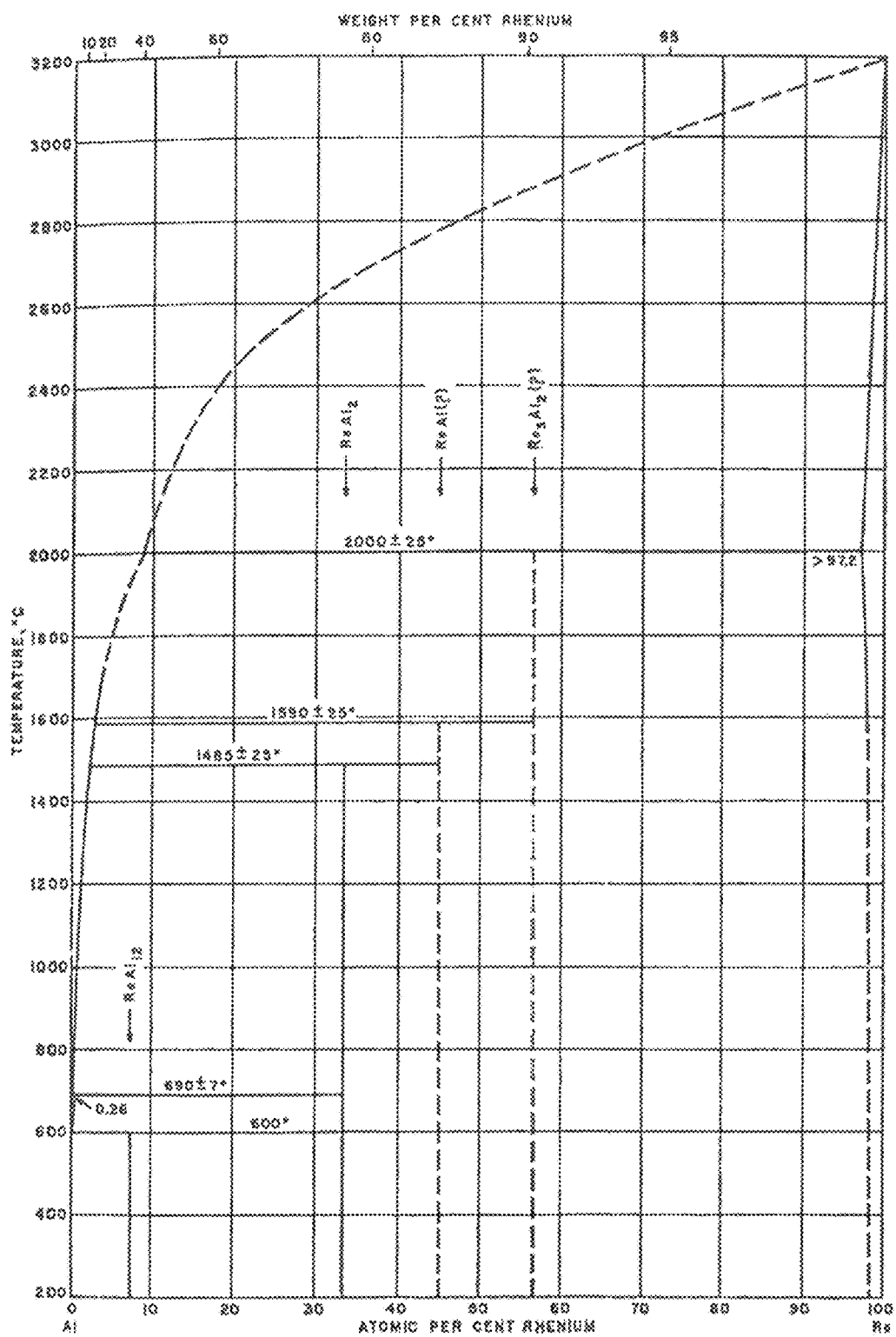
FIG. 14 is the Al—Re phase diagram, exhibiting zero solubility in aluminum at 660° C. and the peritectic reaction at the peritectic temperature of 690° C.
Figure 15:
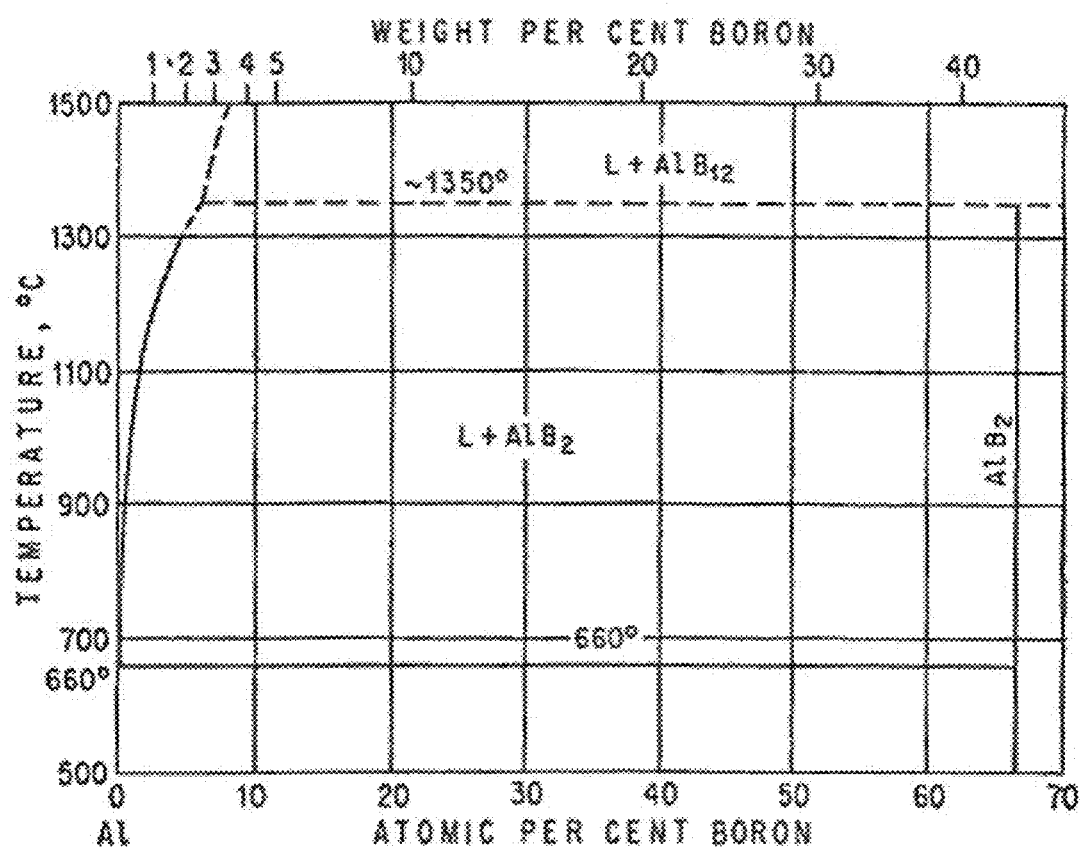
FIG. 15 is the Al—B phase diagram, exhibiting zero solubility of boron in aluminum at 660° C.

FIGS. 4-13 demonstrate that the identified erosion resistant materials exhibit zero solubility at 660° C. in molten aluminum, a peritectic reaction at the aluminum rich end of the phase diagram, with the "liquid+aluminum" field so small that it almost cannot be shown, and with the slope of the liquidus temperature with increasing cited metal should be very high, as high as, of the order of 1000° C./atomic % cited metal. Further, the cited metal must have a melting point 1000 C higher than that of aluminum. Of particular importance regarding the phase diagrams in FIGS. 4-15 is that as the liquidus temperature decreases from 1000° C. to 660° C., the solubility of the cited transition metal in molten aluminum will decrease to very low levels. Accordingly, at the melting point of aluminum, the desired high temperature transition metal will have a relatively slow diffusion rate, due to its high activation energy for self-diffusion and due to the physical barrier provided by the peritectic reaction. FIGS. 14 and 15 demonstrate that Rhenium and Boron are also effective erosion resistant materials.

Figure 3:
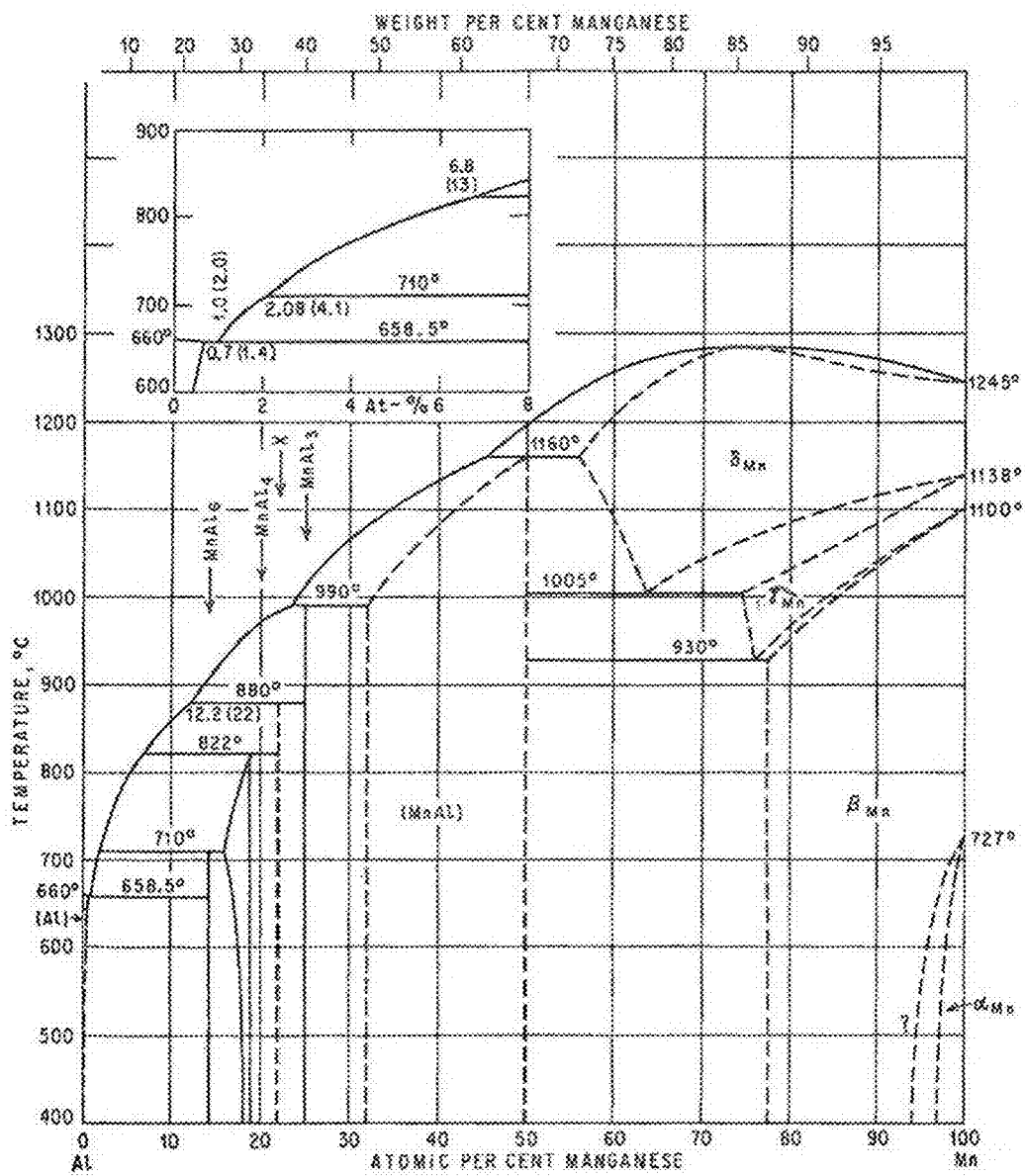
FIG. 3 is the Al—Mn phase diagram demonstrating that the eutectic at the aluminum end of the diagram has a molten aluminum with about 0.7% manganese dissolved in solution.

Manganese (FIG. 3) is not preferred as an insert material for several reasons: (1) there is not a peritectic reaction at the aluminum rich end of the Al—Mn phase diagram but a eutectic reaction that promotes alloying and dissolution, (2) heat travels only 3.5 mm in 5 seconds in manganese, which is only about one third that of iron, (3) the melting point of manganese at 1244° C., is not high compared to the cited group and in fact is about 500° C. lower than the melting point of vanadium, which has the lowest melting point of the cited group, (4) the activation energy for self-diffusion in manganese is low and therefore the diffusion rate is high compared to the cited metals, (5) the coefficient of expansion of manganese at 23×10−6 is double the coefficient of expansion of iron, and the coefficient of expansion of iron is at least 30% higher than that of any member of the cited group, and (6) the thermal conductivity of manganese at 7.8 W/m/C is only about one third that of titanium, zirconium, and hafnium, which have the lowest thermal conductivities of the group at about 23 W/m/C.

Additional erosion resistant materials for a modified shot sleeve construction for use with low iron aluminum silicon alloys include alloys selected from a combination of elements among the first, second, or third groups noted above. Other erosion resistant materials for a modified shot sleeve construction for use with low iron aluminum silicon alloys further include tertiary alloys selected from a combination of elements among the first, second or third groups noted above. Still further erosion resistant materials for a modified shot sleeve construction for use with low iron aluminum silicon alloys include quaternary alloys selected from a combination of elements among the first, second, or third groups noted above. It is also contemplated that alloys of higher than a quaternary combination selected from a combination of elements among the first, second, or third groups noted above will operate sufficiently in accordance with the present application because these elements are completely soluble in each other in binary phase diagrams with each other at temperatures approaching their solidus melting temperatures. Moreover, rhenium, boron and secondary, binary or quaternary alloys thereof are erosion resistant materials contemplated as being with the scope of this application.

Other erosion resistant materials for a modified shot sleeve construction for use with low iron aluminum silicon alloys include binary alloys selected from a combination of elements among rows 1, 2 or 3 in the periodic table insert shown, above or columns IV b, V b, VI b, VII b, and VIII b of the periodic table insert. Additional erosion resistant materials for a modified shot sleeve construction for use with low iron aluminum silicon alloys include tertiary alloys selected from a combination of elements among rows 1, 2 or 3 above or columns IV b, V b, VI b, VII b, and VIII b above. Further erosion resistant materials for a modified shot sleeve construction for use with low iron aluminum silicon alloys include quaternary alloys selected from a combination of elements among rows 1, 2 or 3 above or columns IV b, V b, VI b, VII b, and VIII b above. Moreover, it is contemplated that alloys of higher than a quaternary combination selected from a combination of elements among row 1, 2 or 3 above or columns IV b, V b, VI b, VII b, and VIII b above will operate sufficiently in accordance with the present application.

However, the particular aspects of the identified elements and their alloys (i.e. zero solubility with molten aluminum at 660° C.) are preferably intact in any alloy used for the present application. The criticality of this aspect is demonstrated through the Stellite #6 alloy (28.5% Cr, 4.5% W, 60% Co, 2% Fe, 1% C, 1% Si). This alloy was tested as a welded insert with conventional high iron containing die casting alloys at Case Western Reserve University by J. Wallace, D. Schwam and S. Birceanu, and was concluded to perform very poorly. The inventors anticipate this failure is due to the solubility of the cobalt in the liquid aluminum.

The phase diagrams of FIGS. 21-28 are phase diagrams with niobium that indicate complete solubility with titanium, zirconium, hafnium, vanadium, tantalum, chromium and tungsten, particularly at temperatures approaching the solidus melting temperatures. This is due to the similar outer electronic configurations, and a crystal structure at the elevated temperature of either bcc or cph.

The present application is further directed to a method of manufacturing a shot sleeve for high pressure die casting of aluminum silicon alloys having an erosion resistant material at an impingement site. This method generally comprises providing a high pressure die casting shot sleeve 2 constructed of conventional material such H13 steel or other known material as is well known in the art. As shown in FIG. 17, the shot sleeve 2 is generally cylindrical in shape and has a length. As shown in FIGS. 17 and 18, the shot sleeve further including a pouring hole 12 extending from an outer surface 40 through to an inner surface 42 and an impingement site 18 located opposite the pouring hole 12 on the inner surface 42 of the shot sleeve 2. The method then contemplates replacing the impingement site 18 with an erosion resistant material. As described above the erosion resistant material is selected from one of: titanium, tungsten, molybdenum, ruthenium, tantalum, niobium, chromium, vanadium, zirconium, hafnium or a binary, tertiary or quaternary alloy formed from combination thereof.

The step of replacing the impingement site with erosion resistant material may also include the additional steps of cutting the shot sleeve 2 longitudinally at a first location circumferentially distal to the pouring hole 12 and at a second location circumferentially opposite to the first location. In FIG. 17, the longitudinal cuts are designated by longitudinal split lines 6 and 8. The longitudinal cuts extend at least one fourth of the length of the sleeve 2 to define terminal longitudinal ends 50 of the longitudinal cuts. The shot sleeve 2 may then be cut transversely to connect the terminal longitudinal ends 50 of the longitudinal cuts. The transverse cut is shown in FIG. 17 by transverse split line 7. The bottom portion 14 of the conventional shot sleeve defined by the longitudinal and transverse cuts may then be removed and replaced with a bottom portion 14 of erosion resistant material that is cast to match the removed bottom portion 14 of conventional material. The bottom portion 14 of erosion resistant material is then fastened to the remaining high pressure die casting shot sleeve constructed of conventional material with bolts 28 or other applicable fasteners.

Alternatively, and referring again to FIG. 20, the step of replacing the impingement site with erosion resistant material may include the additional steps of casting an insert 20 of erosion resistant material, the insert 20 having an inner surface 46, an outer surface 44, and a diameter defined by the outer surface 44. An insert hole 32 is also formed in the insert 20 during casting. Material from the inner surface 42 of the high pressure die casting shot sleeve 2 constructed of conventional material is removed such that a diameter defined by the inner surface 42 of the high pressure die casting shot sleeve corresponds to the diameter defined by the outer surface 44 of the insert 20. The insert 20 is then introduced into the area 24 defined by the inner surface 42 of the high pressure die casting shot sleeve 2 such that the impingement site 18 is on the insert 20.

The step of introducing may further include aligning the insert 20 in the shot sleeve 2 such that the insert hole 32 aligns with the pouring hole 12.

EXAMPLES

Example 1

Two millimeter diameter rods of 8.5 inch lengths of niobium and H-13 steel were placed together into the same drill bit on a 24 inch long extension shaft of an electric drill. The assembly was rotated at 30 rpm in molten aluminum alloy 362 at 1300 F (704 C). After 16 hours of rotation with 6.5 inches of the rods submerged into the molten bath, there was complete solution of the H-13 steel into the bath at sometime less than 16 hours, but no dissolution of the niobium rod into the molten bath of alloy 362 at 1300 F. This experiment confirms the benefit of using the erosion resistant niobium metal that is insoluble in aluminum at 660 C over H-13 steel as an insert material in the shot sleeve assembly in avoiding the washout dissolution problem with the die casting of low iron containing die casting alloys, like alloy 362.

Example 2

A tungsten rod of 19.8 cm (7.8 inch) length and 3.8 mm (0.15 inch) diameter was placed into a drill bit on a 24 inch long shaft. The tungsten rod portion of the assembly was submerged 6 inches into the bath so that about 2 inches of the rod was above the surface of the bath. After 16 hours of submersion in molten aluminum alloy 362 at 1300 F (704 C), the tungsten rod was removed and wiped clean of any molten metal. A visual and a scanning electron examination of the rod indicated no dissolution or attack of the tungsten. This experiment, which is believed to be more severe than spinning the rod, confirms that tungsten has excellent washout characteristics for die casting with a low iron containing alloy such as alloy 362. Similar results have been demonstrated for molybdenum, chromium, rhenium, tantalum, vanadium, zirconium, hafnium, technetium, niobium, ruthenium and titanium.

Example 3

A tungsten insert was constructed for the shot sleeve design shown in FIGS. 16-19. The insert was placed into the shot sleeve in accordance with the present application and put into production for the high pressure die casting of low iron aluminum silicon alloys. Compared to the same H-13 steel insert in the same shot sleeve design, the tungsten insert exhibits at least a 10 to 100 times longer life.

Example 4

Example 2 was repeated with an alloy of 90% W, 4% Mo, 4% Ni and 2% Fe with the same dimensions identified in Example 2. Unlike the 100% W rod of Example 2 which exhibited no dissolution in the molten alloy 362 at 1300 F for 16 hours, the alloy rod of 90% W, 4% Mo, 4% Ni, 2% Fe exhibited significant dissolution after 16 hours in the molten bath of alloy 362 and as a result had a diameter of only 1 mm. This means more than 90% of the mass of the alloy was lost in this test because of the solution of the nickel and iron into the molten bath. This performance of the 90% W alloy in the static immersion test was, however, several times better that 1H-13 steel in the same test. In spite of the significant dissolution of the 90% W alloy in the static immersion test after 16 hours at 1300 F, when this 90% W alloy was welded into the bottom shot sleeve segment at the impingement site, the shot sleeve life significantly exceeded that for shot sleeve made of H-13 steel. It is believed that the high thermal conductivity and large distance that heat can travel in 5 seconds in the 90% W alloy is responsible for dispersing the heat at the impingement site to sites far removed from the impingement site, thus, delaying "heat saturation" that occurs in the very severe static immersion test very quickly. This means with high production volumes of large parts, as opposed to low production volumes of small parts, of hot metal the shot sleeve of the 90% W alloy reaches the critical "heat saturation" levels, i.e., the conditions of static immerge test, and washout can occur. With the 100% W alloy washout does not occur, i.e., Example 3, because dissolution does not occur in the static immerge test after 16 hours at 1300 F.

In the above description certain terms have been used for brevity, clearness and understanding. No unnecessary limitations are to be implied therefrom beyond the requirement of the prior art because such terms are used for descriptive purposes only and are intended to be broadly construed. The different systems and methods described herein above may be used in alone or in combination with other systems and methods. Various equivalents, alternatives and modifications are possible within the scope of the appended claims. Each limitation in the appended claims is intended to invoke interpretation under 35 USC §112, sixth paragraph only the terms "means for" or "step for" are explicitly recited in the respective limitation. While each of the method claims includes a specific series of steps for accomplishing certain control system functions, the scope of this disclosure is not intended to be bound by the literal order or literal content of steps described herein, and non-substantial differences or changes still fall within the scope of the disclosure.

What is claimed is:

1. A method of manufacturing a shot sleeve for high pressure die casting of aluminum silicon alloys containing 0.40% max Fe, having an erosion resistant material at an impingement site, the method comprising:
   providing a high pressure die casting shot sleeve constructed of an iron-based material, the shot sleeve having a length, the shot sleeve further including a pouring hole extending from an outer surface through to an inner surface and an impingement site opposite the pouring hole on the inner surface of the shot sleeve; and
   replacing the impingement site with an erosion resistant material that prevents erosion from the aluminum silicon alloys through insolubility in molten aluminum;
   wherein the erosion resistant material comprises at least 80% of any one of the following elements: titanium, tungsten, molybdenum, ruthenium, tantalum, niobium, chromium vanadium, zirconium, hafnium, rhenium, or boron.

2. The method of claim 1, wherein the shot sleeve is cylindrical in shape and the step of replacing further comprises:
   cutting the shot sleeve longitudinally at a first location circumferentially distal to the pouring hole and at a second location circumferentially opposite to the first location, the cutting extending at least one fourth of the length of the sleeve to define longitudinal cuts having terminal longitudinal ends;

cutting the shot sleeve transversely to connect the terminal longitudinal ends of the longitudinal cuts and define transverse cuts;

removing the bottom portion of the iron-based shot sleeve defined by the longitudinal and transverse cuts;

casting a bottom portion of erosion resistant material to match the removed bottom portion of iron-based material; and fastening the bottom portion of erosion resistant material to the remaining high pressure die casting shot sleeve constructed of iron-based material.

3. The method of claim 1, wherein the step of replacing further comprises:

casting an insert of erosion resistant material, the insert having an inner surface, an outer surface, and a diameter defined by the outer surface;

removing material from the inner surface of the high pressure die casting shot sleeve constructed of iron-based material such that a diameter defined by the inner surface of the high pressure die casting shot sleeve corresponds to the diameter defined by the outer surface of the insert;

and introducing the insert into the inner surface of the high pressure die casting shot sleeve constructed of iron-based material such that the impingement site is on the insert.

4. A method of manufacturing a shot sleeve for high pressure die casting of aluminum silicon alloys containing 0.40% max Fe, having an erosion resistant material at an impingement site, the method comprising:

providing a high pressure die casting shot sleeve constructed of an iron-based material, the shot sleeve having a length, the shot sleeve further including a pouring hole extending from an outer surface through to an inner surface and an impingement site opposite the pouring hole on the inner surface of the shot sleeve; and covering the impingement site with an erosion resistant material that prevents erosion from the aluminum silicon alloys through insolubility in molten aluminum;

wherein the erosion resistant material comprises at least 80% of any one of the following elements: titanium, tungsten, molybdenum, ruthenium, tantalum, niobium, chromium vanadium, zirconium, hafnium, rhenium, or boron.

5. The method of claim 4, wherein the step of covering further comprises depositing the erosion resistant material on the inner surface of the shot sleeve.

6. The method of claim 5 wherein the step of depositing comprises spray welding the erosion resistant material.

7. The method of claim 5 wherein the step of depositing comprises circular welding the erosion resistant material.

8. The method of claim 5 wherein the step of depositing comprises laser welding powdered erosion resistant material.

9. The method of claim 4 wherein the step of covering further comprises:

casting an insert of erosion resistant material, the insert having an inner surface, an outer surface, and a diameter defined by the outer surface;

removing material from the inner surface of the high pressure die casting shot sleeve constructed of an iron-based material such that a diameter defined by the inner surface of the high pressure die casting shot sleeve corresponds to the diameter defined by the outer surface of the insert;

and introducing the insert into the inner surface of the high pressure die casting shot sleeve constructed of iron-based material such that the impingement site is on the insert.

10. The method of claim 9 wherein the step of introducing comprises press fitting the insert into the inner surface of the high pressure die casting shot sleeve.

11. The method of claim 4, wherein the shot sleeve is cylindrical and the step of covering further comprises:

cutting the shot sleeve longitudinally at a first location circumferentially distal to the pouring hole and at a second location circumferentially opposite to the first location, the cutting extending along the length of the sleeve to separate the shot sleeve into halves, the halves comprising a top portion and a bottom portion, the bottom portion including the impingement site;

separating the bottom portion from the top portion;

depositing the erosion resistant material on the inner surface of the bottom portion of the shot sleeve; and fastening the bottom portion to the top portion.

12. The method of claim 11 wherein the step of fastening comprises welding or bolting the bottom portion to the top portion.

13. The method of claim 11 wherein the step of depositing comprises spray welding the erosion resistant material.

14. The method of claim 11 wherein the step of depositing comprises circular welding the erosion resistant material.

15. The method of claim 11 wherein the step of depositing comprises laser welding powdered erosion resistant material.

* * * * *